(12) United States Patent
Han et al.

(10) Patent No.: US 12,512,135 B2
(45) Date of Patent: Dec. 30, 2025

(54) SEMICONDUCTOR MEMORY DEVICE

(71) Applicant: Samsung Electronics Co., Ltd., Suwon-si (KR)

(72) Inventors: Jin Woo Han, Suwon-si (KR); Hyun Geun Choi, Suwon-si (KR); Ki Seok Lee, Suwon-si (KR); Seok Han Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 18/329,067

(22) Filed: Jun. 5, 2023

(65) Prior Publication Data

US 2024/0119978 A1    Apr. 11, 2024

(30) Foreign Application Priority Data

Oct. 11, 2022    (KR) .................. 10-2022-0129826
Mar. 6, 2023    (KR) .................. 10-2023-0029153

(51) Int. Cl.
*G11C 7/18*    (2006.01)
*G11C 5/06*    (2006.01)
(Continued)

(52) U.S. Cl.
CPC .............. *G11C 7/18* (2013.01); *G11C 5/063* (2013.01); *G11C 7/12* (2013.01); *G11C 11/404* (2013.01); *G11C 11/4097* (2013.01); *H10B 12/30* (2023.02); *H10B 12/482* (2023.02); *H10B 12/50* (2023.02); *G11C 5/025* (2013.01)

(58) Field of Classification Search
CPC .. G11C 7/18; G11C 5/063; G11C 7/12; G11C 11/404; G11C 11/4097; G11C 5/025; G11C 2207/005; H10B 12/30; H10B 12/482; H10B 12/50
See application file for complete search history.

(56) References Cited

U.S. PATENT DOCUMENTS 8,837,202 B2 *    9/2014    Takemura ................ G11C 8/14
                                                                365/185.26
10,672,456 B2    6/2020    Fishburn et al.
(Continued)

FOREIGN PATENT DOCUMENTS

TW    I767636 B    6/2022

*Primary Examiner* — Amir Zarabian
*Assistant Examiner* — Justin Bryce Heisterkamp
(74) *Attorney, Agent, or Firm* — Wolf, Greenfield & Sacks, P.C.

(57) ABSTRACT

Provided a semiconductor memory device. The semiconductor memory device includes a substrate, a gate electrode on the substrate, a bit line on the substrate, a cell semiconductor pattern on a side of the gate electrode and electrically connected to the bit line, a capacitor structure including a first electrode electrically connected to the cell semiconductor pattern, a second electrode on the first electrode, and a capacitor dielectric film between the first electrode and the second electrode, a bit line strapping line spaced apart from the bit line in the second direction, and electrically connected to the bit line, a bit line selection line between the bit line and the bit line strapping line, and a selection semiconductor pattern between the bit line and the bit line strapping line and electrically connected to all of the bit line, the bit line strapping line, and the bit line selection line.

20 Claims, 19 Drawing Sheets

(51) Int. Cl.
  *G11C 7/12*     (2006.01)
  *G11C 11/404*   (2006.01)
  *G11C 11/4097*  (2006.01)
  *H10B 12/00*    (2023.01)
  *G11C 5/02*         (2006.01)

(56) References Cited

U.S. PATENT DOCUMENTS

| | | |
|---|---|---|
| 11,081,487 B2 | 8/2021 | Fishburn |
| 11,342,218 B1 * | 5/2022 | Lee .................... H01L 21/02598 |
| 11,380,387 B1 | 7/2022 | He et al. |
| 2019/0103440 A1 * | 4/2019 | Inaba ................. H10N 70/8833 |
| 2020/0279601 A1 * | 9/2020 | Kim .................... G11C 11/4097 |
| 2020/0327926 A1 * | 10/2020 | Bedeschi ............ G11C 11/4096 |
| 2021/0183861 A1 | 6/2021 | Lee et al. |
| 2022/0115378 A1 | 4/2022 | Lee et al. |
| 2022/0173106 A1 | 6/2022 | Choi et al. |
| 2022/0262425 A1 * | 8/2022 | Kim .................... G11C 11/4097 |
| 2023/0141135 A1 * | 5/2023 | Lee .................... H01L 21/0245 257/288 |
| 2023/0410886 A1 * | 12/2023 | Sugimoto ........... G11C 11/4099 |

\* cited by examiner

SEMICONDUCTOR MEMORY DEVICE

CROSS-REFERENCE TO RELATED APPLICATION

This application claims priority from Korean Patent Application No. 10-2022-0129826 filed on Oct. 11, 2022 and No. 10-2023-0029153 filed on Mar. 6, 2023 in the Korean Intellectual Property Office, and all the benefits accruing therefrom under 35 U.S.C. 119, the contents of which in its entirety are herein incorporated by reference.

BACKGROUND

The present disclosure relates to a semiconductor memory device.

In a case of a conventional two-dimensional or planar semiconductor element, a degree of integration of the semiconductor element is mainly determined by an area occupied by a unit memory cell, and thus, is greatly affected by a level of fine pattern forming technology. However, since ultra-expensive apparatuses may be needed in order to make patterns fine, the degree of integration of the two-dimensional semiconductor element has increased, but the increase in the degree of integration is still restrictive. Accordingly, three-dimensional semiconductor memory elements having three-dimensionally arranged memory cells have been proposed.

SUMMARY

Aspects of the present disclosure provide a semiconductor memory device with improved electrical characteristics and reliability.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some embodiments of the present disclosure, there is provided a semiconductor memory device comprising, a substrate, a gate electrode on the substrate and extending in a first direction parallel to an upper surface of the substrate, a bit line on the substrate and extending in a second direction perpendicular to the upper surface of the substrate, a cell semiconductor pattern on one side of the gate electrode and electrically connected to the bit line, a capacitor structure including a first electrode electrically connected to the cell semiconductor pattern, a second electrode on the first electrode, and a capacitor dielectric film between the first electrode and the second electrode, a bit line strapping line spaced apart from the bit line in the second direction, extending in the first direction, and electrically connected to the bit line, a bit line selection line between the bit line and the bit line strapping line and extending in a third direction crossing the first and second directions, and a selection semiconductor pattern between the bit line and the bit line strapping line and electrically connected to all of the bit line, the bit line strapping line, and the bit line selection line.

According to some embodiments of the present disclosure, there is provided a semiconductor memory device comprising, a substrate, a first memory cell on the substrate, storing data, and electrically connected to a first gate electrode extending in a first direction parallel to an upper surface of the substrate, a first bit line extending in a second direction perpendicular to the upper surface of the substrate, a first capacitor structure extending in the first direction, a second memory cell on the substrate, storing data, and electrically connected to a second gate electrode extending in the first direction, a second bit line extending in the second direction, and a second capacitor structure extending in the first direction, a bit line strapping line extending in the first direction and electrically connected to the first and second bit lines, a first bit line selection line between the first bit line and the bit line strapping line, extending in a third direction crossing the first and second directions, and electrically connected to the first bit line, and a second bit line selection line between the second bit line and the bit line strapping line, extending in the third direction, and electrically connected to the second bit line, wherein a voltage is configured to be applied to the bit line strapping line and the first bit line selection line in response to a command to store the data in the first memory cell.

According to some embodiments of the present disclosure, there is provided a semiconductor memory device comprising, a peripheral circuit structure, and a cell structure on the peripheral circuit structure, wherein the peripheral circuit structure includes a substrate, a bit line selection line on the substrate and extending in a third direction parallel to an upper surface of the substrate, and a selection semiconductor pattern electrically connected to the bit line selection line, the cell structure includes a gate electrode extending in a first direction parallel to the upper surface of the substrate, a bit line extending in a second direction perpendicular to the upper surface of the substrate, a cell semiconductor pattern on one side of the gate electrode and electrically connected to the bit line, and a capacitor structure including a first electrode electrically connected to the cell semiconductor pattern, a second electrode on the first electrode, and a capacitor dielectric film between the first electrode and the second electrode, and a signal is transferred to the bit line by applying a voltage to the bit line selection line.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

The terms "first", "second", "upper, "lower", and the like, as used herein are used to describe various elements or components, but these elements or components are not limited by these terms. These terms are used only in order to distinguish one element or component from another element or component. Accordingly, a first element or component to be mentioned below may be a second element or component within the technical spirit of the present disclosure. In addition, a lower element or component to be mentioned below may be an upper element or component within the technical spirit of the present disclosure.

Hereinafter, example embodiments according to the technical spirit of the present disclosure will be described with reference to the accompanying drawings. First, a semiconductor memory device according to some example embodiments will be described with reference to FIGS. 1 to 4.

Figure 1:
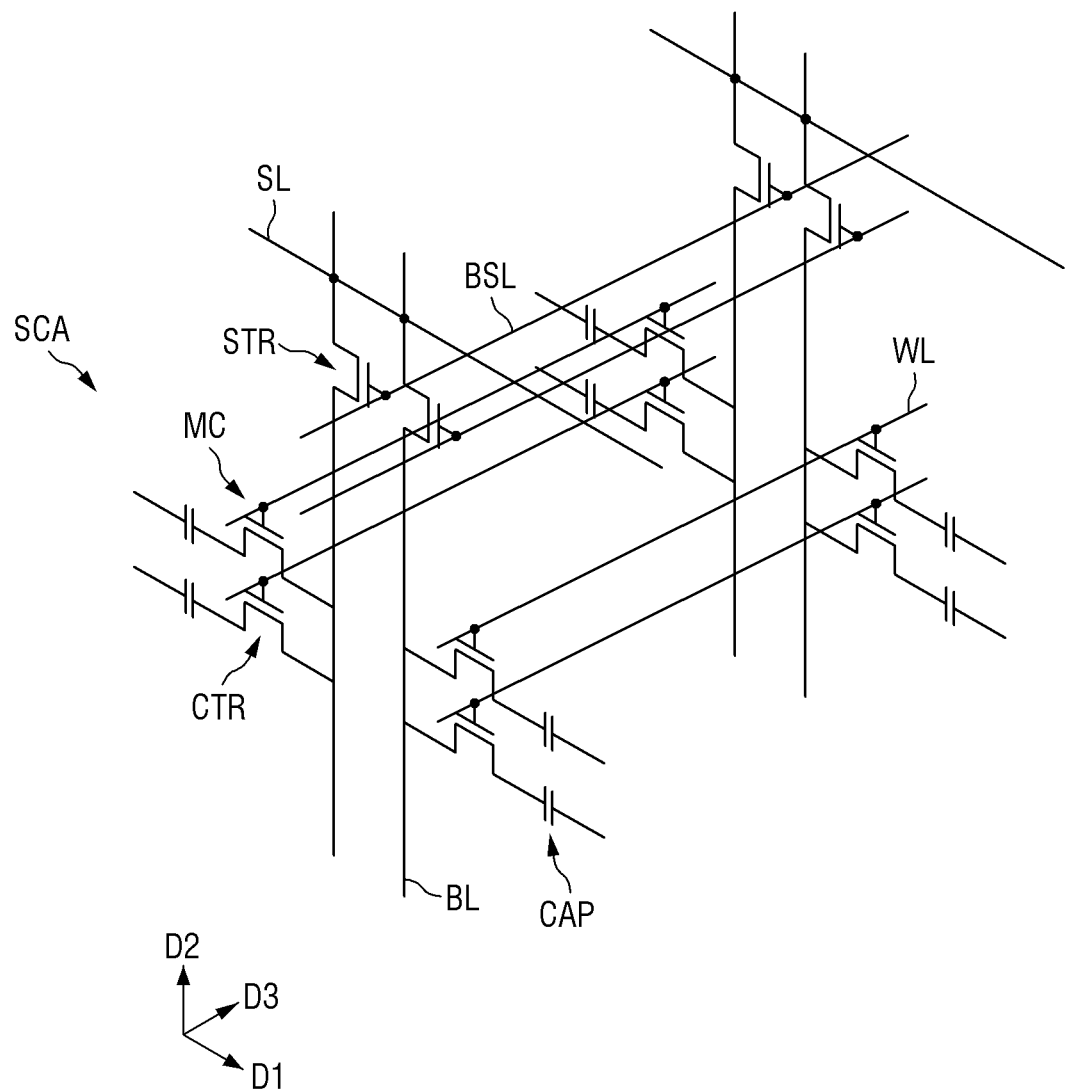
FIG. 1 is an illustrative circuit diagram for describing a semiconductor memory device according to some example embodiments.

FIG. 1 is an illustrative circuit diagram for describing a semiconductor memory device according to some example embodiments.

Referring to FIG. 1, a semiconductor memory device according to some example embodiments may include a plurality of sub-cell arrays SCA. The plurality of sub-cell arrays SCA may be arranged along a second direction D2.

Each of the plurality of sub-cell arrays SCA may include a plurality of memory cells MC arranged along a first direction D1 and a third direction D3. Each memory cell MC may be disposed along the first direction D1 and may include a cell transistor CTR and a capacitor structure CAP connected to each other.

Bit lines BL may be conductive patterns (e.g., metallic conductive lines) extending from a substrate in a direction perpendicular to the substrate (e.g., in the second direction D2). The bit lines BL in one sub-cell array SCA may be arranged in the first direction D1. The bit lines BL adjacent to each other may be spaced apart from each other in the first direction D1.

In some example embodiments, some of a plurality of bit lines BL may be connected to each other by a bit line strapping line SL extending along the first direction D1. For example, the bit line strapping line SL may connect the bit lines BL arranged along the first direction D1 among the plurality of bit lines BL to each other. In the present specification, the first direction D1 and the third direction D3 may be directions parallel to an upper surface of the substrate. The second direction D2 may be a direction perpendicular to the upper surface of the substrate. That is, the first direction D1, the second direction D2, and the third direction D3 may cross each other. Substantially, the first direction D1, the second direction D2, and the third direction D3 may be perpendicular to each other.

Word lines WL may be conductive patterns (e.g., metallic conductive lines) stacked in the second direction D2 on the substrate. Each of the word lines WL may extend in the third direction D3. Each of the word lines WL may also extend in the first direction D1. The word lines WL adjacent to each other may be spaced apart from each other in the second direction D2.

The capacitor structure CAP and the cell transistor CTR arranged along the first direction D1 may be disposed symmetrically to each other. However, the technical spirit of the present disclosure is not limited thereto.

A gate of the cell transistor CTR may be connected to the word line WL, and a source/drain pattern of the cell transistor CTR may be connected to the bit line BL. Another source/drain pattern of the cell transistor CTR may be connected to the capacitor structure CAP. For example, the capacitor structure CAP may be a capacitor. Another source/drain pattern of the cell transistor CTR may be connected to a lower electrode of the capacitor.

In some example embodiments, some of the plurality of bit lines BL may be connected to each other by bit line selection lines BSL extending along the third direction D3. For example, the bit line selection lines BSL may connect the bit lines BL arranged along the third direction D3 among the plurality of bit lines BL to each other. The bit line selection lines BSL may be conductive patterns extending in the third direction D3.

The semiconductor memory device according to some example embodiments may further include a selection transistor STR.

A gate of the selection transistor STR may be connected to the bit line selection line BSL, and a source/drain pattern of the selection transistor STR may be connected to the bit line BL. Another source/drain pattern of the selection transistor STR may be connected to the bit line strapping line SL. A bit line BL to be operated may be selected using the selection transistor STR and a voltage may be applied only to the selected bit line BL. That is, a total amount of capacitance of the bit lines BL may decrease. Accordingly, a semiconductor memory device with improved reliability may be provided.

Figure 2:
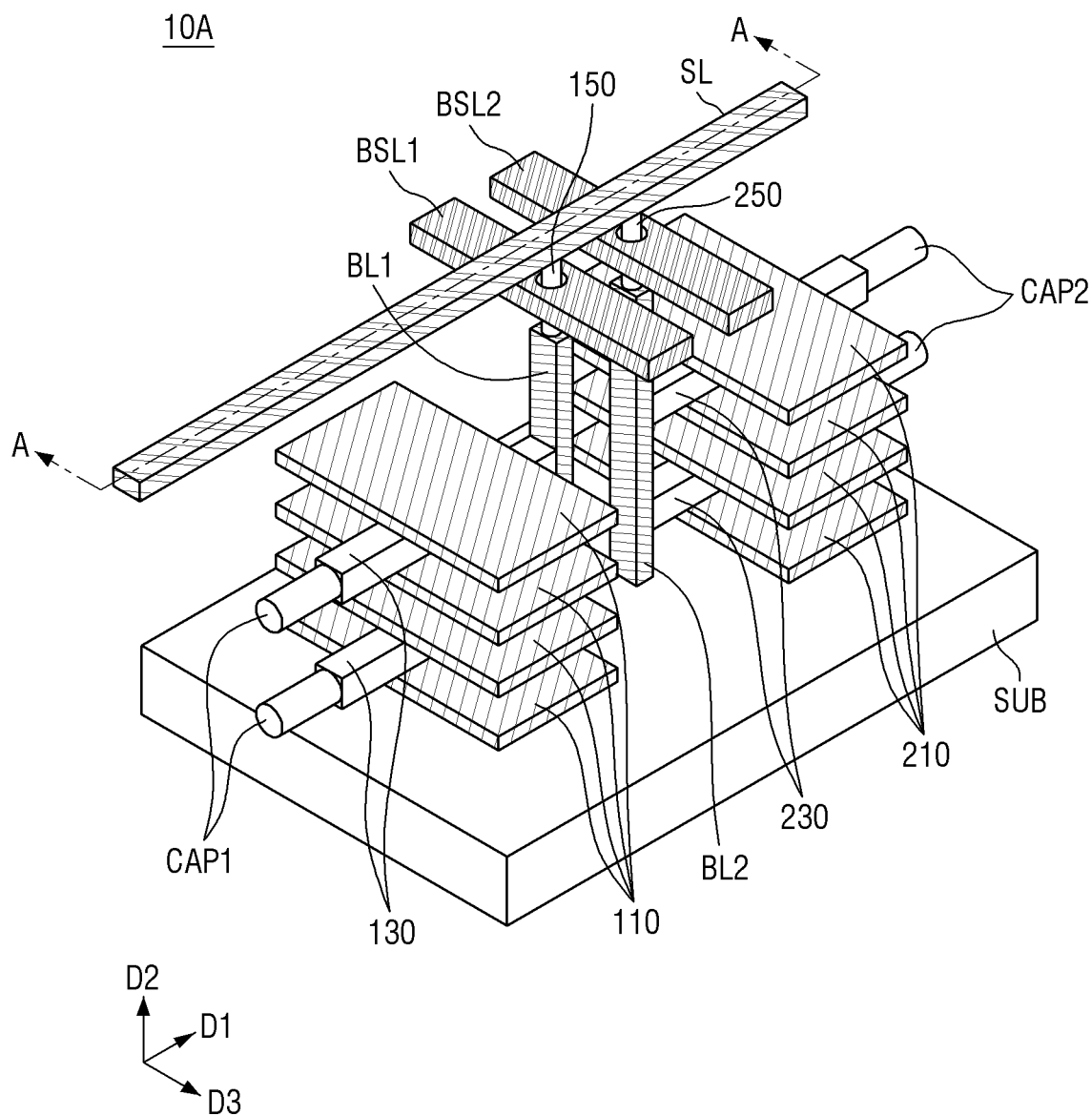
FIG. 2 is an illustrative perspective view for describing a semiconductor memory device according to some example embodiments.
Figure 3:
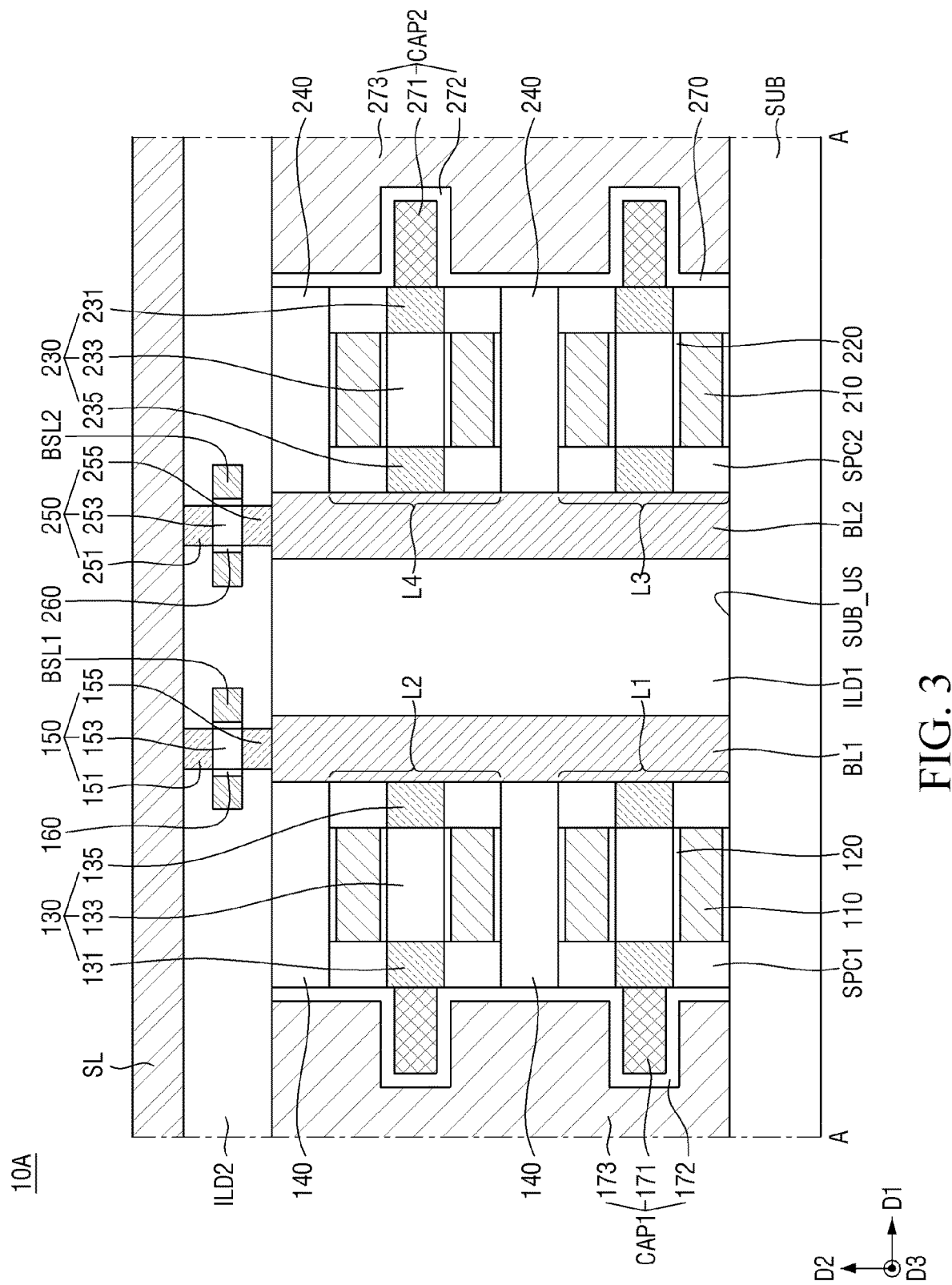
FIG. 3 is an illustrative cross-sectional view taken along line A-A of FIG. 2.
Figure 4:
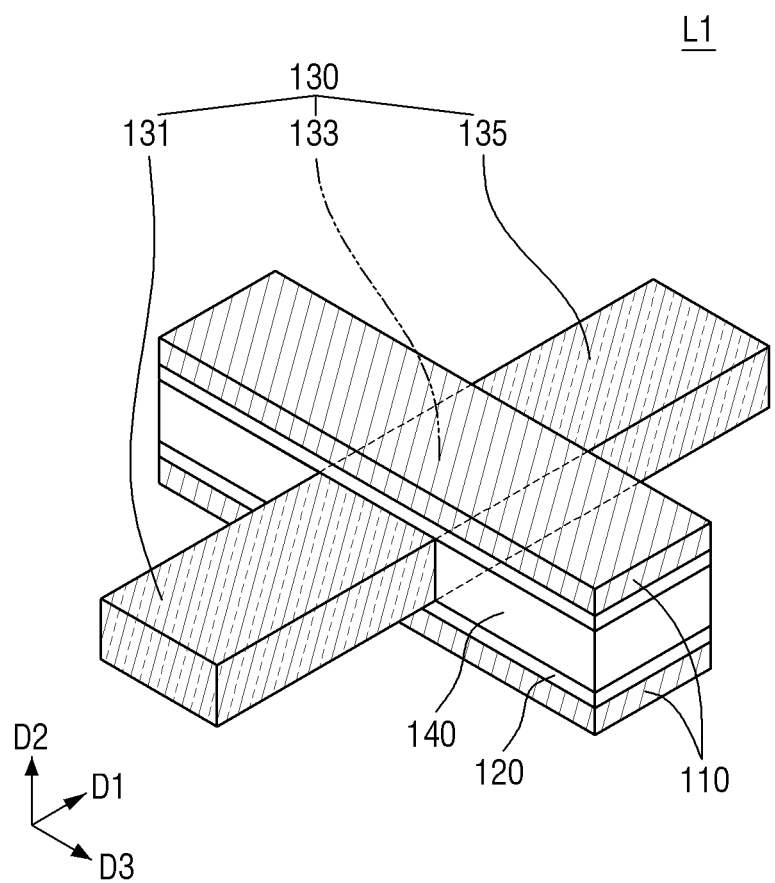
FIG. 4 is a perspective view for describing a first layer of FIG. 3.

FIG. 2 is an illustrative perspective view for describing a semiconductor memory device according to some example embodiments. FIG. 3 is an illustrative cross-sectional view taken along line A-A of FIG. 2. FIG. 4 is a perspective view for describing a first layer of FIG. 3.

Referring to FIGS. 2 to 4, a semiconductor memory device 10A according to some example embodiments may include a substrate SUB, first and second bit lines BL1 and BL2, first and second gate electrodes 110 and 210, first and second bit line selection lines BSL1 and BSL2, a bit line strapping line SL, and first and second capacitor structures CAP1 and CAP2. One of the plurality of sub-cell arrays SCA described with reference to FIG. 1 may be disposed on the substrate SUB.

The substrate SUB may be bulk silicon or silicon-on-insulator (SOI). In some embodiments, the substrate SUB may be a silicon substrate or may include other materials such as silicon germanium, silicon germanium on insulator (SGOI), indium antimonide, a lead tellurium compound, indium arsenide, indium phosphide, gallium arsenide, or gallium antimonide, but is not limited thereto. It will be described in the following description that the substrate SUB is a substrate including silicon.

The first bit line BL1 and the second bit line BL2 may be disposed on the substrate SUB. The first bit line BL1 and the second bit line BL2 may extend in the second direction D2 perpendicular to an upper surface SUB_US of the substrate SUB. The first bit line BL1 and the second bit line BL2 may be spaced apart from each other in the first direction D1 parallel to the upper surface SUB_US of the substrate SUB.

Each of the first bit line BL1 and the second bit line BL2 may include, for example, at least one of a doped semiconductor material such as silicon doped with impurities or germanium doped with impurities, a conductive metal nitride such as titanium nitride or tantalum nitride, a metal such as tungsten, titanium, or tantalum, and a metal-semiconductor compound such as tungsten silicide, cobalt silicide, or titanium silicide, but is not limited thereto. The first bit line BL1 and the second bit line BL2 may be the bit lines BL described with reference to FIG. 1, respectively.

A stacked structure including a first layer L1 and a second layer L2 may be disposed on the substrate SUB. The first layer L1 and the second layer L2 may be stacked to be spaced apart from each other in the second direction D2 perpendicular to the upper surface SUB_US of the substrate SUB. It has been illustrated in FIG. 3 that the semiconductor memory device 10A according to some example embodiments includes only two layers, but the technical spirit of the present disclosure is not limited thereto. In some example embodiments, three or more layers may be stacked in the second direction D2.

The first layer L1 and the second layer L2 may be connected to the first bit line BL1. Each of the first layer L1 and the second layer L2 may include a pair of first gate electrodes 110, first cell gate insulating films 120, and a first cell semiconductor pattern 130.

The first cell semiconductor pattern 130 may have a line shape or a bar shape in which it extends in the first direction D1. The first cell semiconductor pattern 130 may include a semiconductor material such as silicon, germanium, or silicon-germanium. As an example, the first cell semiconductor pattern 130 may include at least one of polysilicon, polysilicon germanium, single crystal silicon, and single crystal silicon-germanium.

The first cell semiconductor pattern 130 may include a first cell source/drain pattern 131, a second cell source/drain pattern 135, and a first cell channel pattern 133.

The first cell channel pattern 133 may be disposed between the first cell source/drain pattern 131 and the second cell source/drain pattern 135. The first cell source/drain pattern 131 may be disposed on one side of the first cell channel pattern 133, and the second cell source/drain pattern 135 may be disposed on the other side of the first cell channel pattern 133. The first cell channel pattern 133 may correspond to a channel of the cell transistor CTR (see FIG. 1) described with reference to FIG. 1. The first cell source/drain pattern 131 and the second cell source/drain pattern 135 may correspond to source/drain patterns of the cell transistor CTR described with reference to FIG. 1.

The first and second cell source/drain patterns 131 and 135 may be regions in which the first cell semiconductor pattern 130 is doped with impurities, respectively. Thus, each of the first and second cell source/drain patterns 131 and 135 may have n-type or p-type conductivity. The first cell source/drain pattern 131 may be connected to the first capacitor structure CAP1, and the second cell source/drain pattern 135 may be connected to the first bit line BL1.

The first and second capacitor structures CAP1 and CAP2 may be memory elements capable of storing data. Each of the first and second capacitor structures CAP1 and CAP2 may be a memory element using a capacitor, a memory element using a magnetic tunnel junction pattern, or a memory element using a variable resistor including a phase change material.

The first gate electrodes 110 may have a plate shape in which they extend in the first direction D1 and the third direction D3. The first gate electrodes 110 may be stacked to be spaced apart from each other along the second direction D2. The first gate electrodes 110 may traverse the first cell semiconductor pattern 130 in one layer. The first gate electrodes 110 may be the word lines WL described with reference to FIG. 1.

In some example embodiments, the first gate electrodes 110 may be disposed on one side and the other side of the first cell semiconductor pattern 130, respectively. The first gate electrodes 110 may be disposed on upper and lower surfaces of the first cell semiconductor pattern 130, respectively. The first cell semiconductor pattern 130 may be interposed between the pair of first gate electrodes 110. That is, the cell transistor CTR (see FIG. 1) may be a double-gate transistor in which the first gate electrodes 110 are provided on both surfaces of the first cell channel pattern 133.

The first gate electrode 110 may include a conductive material. As an example, the first gate electrode 110 may include at least one of a doped semiconductor material (doped silicon, doped silicon-germanium, doped germanium, etc.), a conductive metal nitride (titanium nitride, tantalum nitride, etc.), a metal (tungsten, titanium, tantalum, etc.), and/or a metal-semiconductor compound (tungsten silicide, cobalt silicide, titanium silicide, etc.), but is not limited thereto.

The first cell gate insulating films 120 may be interposed between the first gate electrodes 110 and the first cell channel pattern 133. It has been illustrated that the first cell gate insulating films 120 are interposed only between the first gate electrodes 110 and the first cell channel pattern 133, but the technical spirit of the present disclosure is not limited thereto. The first cell gate insulating films 120 may also be formed along profiles of the first gate electrodes 110.

The first cell gate insulating film 120 may include at least one of a high-k insulating film, a silicon oxide film, a silicon nitride film, and a silicon oxynitride film. As an example, the high-k insulating film may include at least one of hafnium oxide, hafnium silicon oxide, lanthanum oxide, zirconium oxide, zirconium silicon oxide, tantalum oxide, titanium oxide, barium strontium titanium oxide, barium titanium oxide, strontium titanium oxide, lithium oxide, aluminum oxide, lead scandium tantalum oxide, and/or lead zinc niobate.

A first mold insulating layer 140 may be disposed between the first layer L1 and the second layer L2. Empty spaces between the first layer L1 and the second layer L2 may be filled with the first mold insulating layer 140. Although not illustrated, the first mold insulating layer 140 may be disposed between the substrate SUB and the first layer L1. The first mold insulating layer 140 may include an insulating material. The first mold insulating layer 140 may include, for example, at least one of a silicon oxide film, a silicon nitride film, a silicon oxynitride film, a carbon-containing silicon oxide film, a carbon-containing silicon nitride film, and a carbon-containing silicon oxynitride film. As an example, the first mold insulating layer 140 may include a silicon oxide film.

A first spacer pattern SPC1 may be disposed between the first gate electrode 110 and the first bit line BL1. The first spacer pattern SPC1 may be disposed between the first capacitor structure CAP1 and the first gate electrode 110. The first spacer pattern SPC1 may be interposed between the first mold insulating layer 140 and the first cell semiconductor pattern 130. The first spacer pattern SPC1 may be interposed between the first mold insulating layer 140 and the first cell source/drain pattern 131 and/or between the first mold insulating layer 140 and the second cell source/drain pattern 135. The first spacer pattern SPC1 may include, for example, at least one of a silicon oxide film, a silicon nitride film, a silicon oxynitride film, a carbon-containing silicon oxide film, a carbon-containing silicon nitride film, and/or a carbon-containing silicon oxynitride film.

The first capacitor structure CAP1 may be disposed on the first cell semiconductor pattern 130. The first capacitor structure CAP1 may be electrically connected to the first cell source/drain pattern 131. The first capacitor structure CAP1 includes a first electrode 171, a first capacitor dielectric film 172, and a second electrode 173.

The first electrode 171 may be disposed on the first cell semiconductor pattern 130. It has been illustrated that the first electrode 171 has a pillar shape, but the present disclosure is not limited thereto. The first electrode 171 may have a cylindrical shape. The first capacitor dielectric film 172 is formed on the first electrode 171. The first capacitor dielectric film 172 may be formed along a profile of the first electrode 171. The first capacitor dielectric film 172 may be interposed between the first electrode 171 and the second electrode 173. The second electrode 173 is formed on the first capacitor dielectric film 172. The second electrode 173 may surround an outer sidewall of the first electrode 171.

Each of the first electrode 171 and the second electrode 173 may include, for example, a doped semiconductor material, a conductive metal nitride (e.g., titanium nitride, tantalum nitride, niobium nitride, or tungsten nitride), a metal (e.g., ruthenium, iridium, titanium, or tantalum), and/or a conductive metal oxide (e.g., iridium oxide or niobium oxide), and the like, but is not limited thereto.

The first capacitor dielectric film 172 may include, for example, one of silicon oxide, silicon nitride, silicon oxynitride, a high-k material, and/or combinations thereof, but is not limited thereto. In the semiconductor memory device according to some example embodiments, the first capacitor dielectric film 172 may have a stacked film structure in which zirconium oxide, aluminum oxide, and zirconium oxide are sequentially stacked. In the semiconductor memory device according to some example embodiments, the first capacitor dielectric film 172 may include a dielectric film including hafnium (Hf). In the semiconductor memory device 10A according to some example embodiments, the first capacitor dielectric film 172 may have a stacked film structure of a ferroelectric material film and a paraelectric material film.

In some example embodiments, a stacked structure including a third layer L3 and a fourth layer L4 may be disposed on the substrate SUB. The third layer L3 and the second layer L4 may be stacked to be spaced apart from each other in the second direction D2. The third layer L3 may be spaced apart from the first layer L1 in the first direction D1, and the fourth layer L4 may be spaced apart from the second layer L2 in the first direction D1.

The third layer L3 and the fourth layer L4 may be connected to the second bit line BL2. Each of the third layer L3 and the fourth layer L4 may include a pair of second gate electrodes 210, second cell gate insulating films 220, and a second cell semiconductor pattern 230.

The second cell semiconductor pattern 230 may have a line shape or a bar shape in which it extends in the first direction D1. The second cell semiconductor pattern 230 may extend in an opposite direction to an extension direction of the first cell semiconductor pattern 130. The second cell semiconductor pattern 230 may be formed of the same material as the first cell semiconductor pattern 130.

The second cell semiconductor pattern 230 may include a third cell source/drain pattern 231, a fourth cell source/drain pattern 235, and a second cell channel pattern 233. The second cell channel pattern 233 may be disposed between the third cell source/drain pattern 231 and the fourth cell source/drain pattern 235. The second cell channel pattern 233 may correspond to a channel of the cell transistor CTR described with reference to FIG. 1. The third cell source/drain pattern 231 and the fourth cell source/drain pattern 235 may correspond to source/drain patterns of the cell transistor CTR described with reference to FIG. 1.

The third and fourth cell source/drain patterns 231 and 235 may be regions in which the second cell semiconductor pattern 230 is doped with impurities. Thus, the third and fourth cell source/drain patterns 231 and 335 may have n-type or p-type conductivity. The third cell source/drain pattern 231 may be connected to the second capacitor structure CAP2, and the fourth cell source/drain pattern 235 may be connected to the second bit line BL2.

The second gate electrodes 210 may have a plate shape in which they extend in the first direction D1 and the third direction D3. The second gate electrodes 210 may be stacked to be spaced apart from each other along the second direction D2. The second gate electrodes 210 may traverse the second cell semiconductor pattern 230 in one layer. The second gate electrodes 210 may be the word lines WL described with reference to FIG. 1.

In some example embodiments, the second gate electrodes 210 may be disposed on one side and the other side of the second cell semiconductor pattern 230, respectively. The second gate electrodes 210 may be disposed on upper and lower surfaces of the second cell semiconductor pattern 230, respectively. The second cell semiconductor pattern 230 may be interposed between the pair of second gate electrodes 210. That is, the cell transistor CTR may be a double-gate transistor in which the second gate electrodes 210 are provided on both surfaces of the second cell channel pattern 233.

The second gate electrode 210 may be formed of the same material as the first gate electrode 110.

The second cell gate insulating films 220 may be interposed between the second gate electrodes 210 and the second cell channel pattern 233. It has been illustrated that the second cell gate insulating films 220 are interposed only between the second gate electrodes 210 and the second cell channel pattern 233, but the technical spirit of the present disclosure is not limited thereto. The second cell gate insulating films 220 may also be formed along profiles of the second gate electrodes 210.

The second cell gate insulating film 220 may be formed of the same material as the first cell gate insulating film 120.

A second mold insulating layer 240 may be disposed between the third layer L3 and the fourth layer L4. Empty spaces between the third layer L3 and the fourth layer L4 may be filled with the second mold insulating layer 240. Although not illustrated, the second mold insulating layer 240 may be disposed between the substrate SUB and the third layer L3. The second mold insulating layer 240 may be formed of the same material as the first mold insulating layer 140.

A second spacer pattern SPC2 may be disposed between the second gate electrode 210 and the second bit line BL2. The second spacer pattern SPC2 may be disposed between the second capacitor structure CAP2 and the second gate electrode 210. The second spacer pattern SPC2 may be interposed between the second mold insulating layer 240 and the second cell semiconductor pattern 230. The second spacer pattern SPC2 may be interposed between the second mold insulating layer 240 and the third cell source/drain pattern 231 and/or between the second mold insulating layer 240 and the fourth cell source/drain pattern 235. The second spacer pattern SPC2 may be formed of the same material as the first spacer pattern SPC1.

The second capacitor structure CAP2 may be disposed on the second cell semiconductor pattern 230. The second capacitor structure CAP2 may be electrically connected to the third cell source/drain pattern 231. The second capacitor structure CAP2 includes a third electrode 271, a second capacitor dielectric film 272, and a fourth electrode 273.

The third electrode 271 may be disposed on the second cell semiconductor pattern 230. It has been illustrated that the third electrode 271 has a pillar shape, but the present disclosure is not limited thereto. The third electrode 271 may have a cylindrical shape. The second capacitor dielectric film 272 is formed on the third electrode 271. The second capacitor dielectric film 272 may be formed along a profile of the third electrode 271. The second capacitor dielectric film 272 may be interposed between the third electrode 271 and the fourth electrode 273. The fourth electrode 273 is formed on the second capacitor dielectric film 272. The fourth electrode 273 may surround an outer sidewall of the third electrode 271.

The third electrode 271 and the fourth electrode 273 may be formed of the same materials as the first electrode 171 and the second electrode 173, respectively. The second capacitor dielectric film 272 may be formed of the same material as the first capacitor dielectric film 172.

A first interlayer insulating film ILD1 may be disposed between the first bit line BL1 and the second bit line BL2. The first interlayer insulating film ILD1 may electrically separate the first bit line BL1 and the second bit line BL2 from each other. The first interlayer insulating film ILD1 may include an insulating material. The first interlayer insulating film ILD1 may include, for example, at least one of silicon oxide, silicon oxynitride, and/or a low-k material having a lower dielectric constant than a dielectric constant of silicon oxide, but is not limited thereto.

A second interlayer insulating film ILD2 may be disposed on the first interlayer insulating film ILD1. The second interlayer insulating film ILD2 may include an insulating material. The second interlayer insulating film ILD2 may include, for example, at least one of silicon oxide, silicon oxynitride, and/or a low-k material having a lower dielectric constant than a dielectric constant of silicon oxide, but is not limited thereto.

The first bit line selection line BSL1 and a second bit line selection line BSL2 may be disposed on the first bit line BL1 and the second bit line BL2, respectively. The first bit line selection line BSL1 and the second bit line selection line BSL2 may be disposed in the second interlayer insulating film ILD2. Each of the first bit line selection line BSL1 and the second bit line selection line BSL2 may extend in the third direction D3 parallel to the upper surface SUB_US of the substrate SUB. The first bit line selection line BSL1 may be interposed between the first bit line BL1 and the bit line strapping line SL. In addition, the second bit line selection line BSL2 may be interposed between the second bit line BL2 and the bit line strapping line S L.

The first bit line selection line BSL1 may surround a first selection semiconductor pattern 150 in plan view, to be described later. The second bit line selection line BSL2 may surround a second selection semiconductor pattern 250 in plan view, to be described later. The first bit line selection line BSL1 and the second bit line selection line BSL2 may be the bit line selection lines BSL described with reference to FIG. 1, respectively. That is, each of the first bit line selection line BSL1 and the second bit line selection line BSL2 may be connected to gates of the selection transistors STR described with reference to FIG. 1.

The first bit line selection line BSL1 and the second bit line selection line BSL2 may be conductive patterns (e.g., metallic conductive lines), respectively. Each of the first bit line selection line BSL1 and the second bit line selection line BSL2 may include, for example, at least one of a doped semiconductor material such as silicon doped with impurities or germanium doped with impurities, a conductive metal nitride such as titanium nitride or tantalum nitride, a metal such as tungsten, titanium, or tantalum, and/or a metal-semiconductor compound such as tungsten silicide, cobalt silicide, or titanium silicide, but is not limited thereto.

In some example embodiments, a signal may be transferred to the first bit line BL1 by applying a voltage to the first bit line selection line BSL1. In addition, a signal may be transferred to the second bit line BL2 by applying a voltage to the second bit line selection line BSL2.

The first selection semiconductor pattern 150 may have a line shape or a bar shape in which it extends in the second direction D2. The first selection semiconductor pattern 150 may be interposed between the bit line strapping line SL and the first bit line BL1. The first selection semiconductor pattern 150 may be in contact with the bit line strapping line SL and may be in contact with the first bit line BL1.

The first selection semiconductor pattern 150 may include a semiconductor material such as silicon, germanium, or silicon-germanium. As an example, the first selection semiconductor pattern 150 may include at least one of polysilicon, polysilicon germanium, single crystal silicon, and/or single crystal silicon-germanium.

In some example embodiments, the first selection semiconductor pattern 150 may include a first selection source/drain pattern 151, a second selection source/drain pattern 155, and a first selection channel pattern 153.

The first selection channel pattern 153 may be disposed between the first selection source/drain pattern 151 and the second selection source/drain pattern 155. The first selection channel pattern 153 may be surrounded by the first bit line selection line BSL1 in plan view. In other words, at least a portion of the first selection channel pattern 153 is in the first bit line selection line BSL1. The first selection channel pattern 153 may correspond to a channel of the selection transistor STR described with reference to FIG. 1. That is, the selection transistor STR may have a gate all around (GAA) structure.

The first selection source/drain pattern 151 and the second selection source/drain pattern 155 may correspond to source/drain patterns of the selection transistor STR described with reference to FIG. 1.

The first and second selection source/drain patterns 151 and 155 may be regions in which the first selection semiconductor pattern 150 is doped with impurities, respectively. Thus, each of the first and second selection source/drain patterns 151 and 155 may have n-type or p-type conductivity. The first selection source/drain pattern 151 may be in contact with the bit line strapping line SL. The first selection source/drain pattern 151 may be connected to the bit line strapping line SL. The second selection source/drain pattern 155 may be in contact with the first bit line BL1. The second selection source/drain pattern 155 may be connected to the first bit line BL1.

The second selection semiconductor pattern 250 may have a line shape or a bar shape which extends in the second direction D2. The second selection semiconductor pattern 250 may be interposed between the bit line strapping line SL and the second bit line BL2. The second selection semiconductor pattern 250 may include a semiconductor material such as silicon, germanium, or silicon-germanium. As an example, the second selection semiconductor pattern 250 may include at least one of polysilicon, polysilicon germanium, single crystal silicon, and/or single crystal silicon-germanium.

The second selection semiconductor pattern 250 may include a third selection source/drain pattern 251, a fourth selection source/drain pattern 255, and a second selection channel pattern 253.

The second selection channel pattern 253 may be disposed between the third selection source/drain pattern 251 and the fourth selection source/drain pattern 255. The second selection channel pattern 253 may be surrounded in plan view by the second bit line selection line BSL2. The second selection channel pattern 253 may correspond to a channel of the selection transistor STR described with reference to FIG. 1. The third selection source/drain pattern 251 and the fourth selection source/drain pattern 255 may correspond to source/drain patterns of the selection transistor STR described with reference to FIG. 1.

The third and fourth selection source/drain patterns 251 and 255 may be regions in which the second selection semiconductor pattern 250 is doped with impurities, respectively. Thus, each of the third and fourth selection source/drain patterns 251 and 255 may have n-type or p-type conductivity. The third selection source/drain pattern 251 may be in contact with the bit line strapping line SL. The third selection source/drain pattern 251 may be connected to the bit line strapping line SL. The fourth selection source/drain pattern 255 may be in contact with the second bit line BL2. The fourth selection source/drain pattern 255 may be connected to the second bit line BL2.

A first selection gate insulating film 160 may be interposed between the first bit line selection line BSL1 and the first selection channel pattern 153. The first selection gate insulating film 160 may completely surround the first selection channel pattern 153 in plan view. A second selection gate insulating film 260 may be interposed between the second bit line selection line BSL2 and the second selection channel pattern 253. The second selection gate insulating film 260 may completely surround the second selection channel pattern 253 in plan view.

Each of the first selection gate insulating film 160 and the second selection gate insulating film 260 may include at least one of a high-k insulating film, a silicon oxide film, a silicon nitride film, and/or a silicon oxynitride film. As an example, the high-k insulating film may include at least one of hafnium oxide, hafnium silicon oxide, lanthanum oxide, zirconium oxide, zirconium silicon oxide, tantalum oxide, titanium oxide, barium strontium titanium oxide, barium titanium oxide, strontium titanium oxide, lithium oxide, aluminum oxide, lead scandium tantalum oxide, and/or lead zinc niobate.

The bit line strapping line SL may be disposed on the first and second bit lines BL1 and BL2. The bit line strapping line SL may be disposed on the first and second bit line selection lines BSL1 and BSL2. The bit line strapping line SL may connect the first bit line BL1 and the second bit line BL2 to each other. The bit line strapping line SL may be connected to each of the first bit line selection line BSL1 and the second bit line selection line BSL2. The bit line strapping line SL may extend in the first direction D1. The bit line strapping line SL may be the bit line strapping line SL described with reference to FIG. 1.

The bit line strapping line SL may include, for example, at least one of a doped semiconductor material such as silicon doped with impurities or germanium doped with impurities, a conductive metal nitride such as titanium nitride or tantalum nitride, a metal such as tungsten, titanium, or tantalum, and/or a metal-semiconductor compound such as tungsten silicide, cobalt silicide, or titanium silicide, but is not limited thereto.

In the semiconductor memory device 10A according to some example embodiments, a voltage may be applied to only one of the first bit line selection line BSL1 and the second bit line selection line BSL2. For example, a voltage may be applied to the first bit line selection line BSL1, and may not be applied to the second bit line selection line BSL2. In this case, a current may flow through the first bit line BL1 and may not flow through the second bit line BL2. As such, when the semiconductor memory device 10A according to some example embodiments is used, a bit line to be operated may be selected and a current may flow only through the selected bit line. Accordingly, a total amount of capacitance of the bit lines may decrease. Accordingly, a semiconductor memory device with improved reliability may be provided.

Hereinafter, semiconductor memory devices according to some example embodiments will be described with reference to FIGS. 5 to 18. For convenience of explanation, contents overlapping those described with reference to FIGS. 1 to 4 will be briefly described or a description thereof will be omitted.

Figure 5:
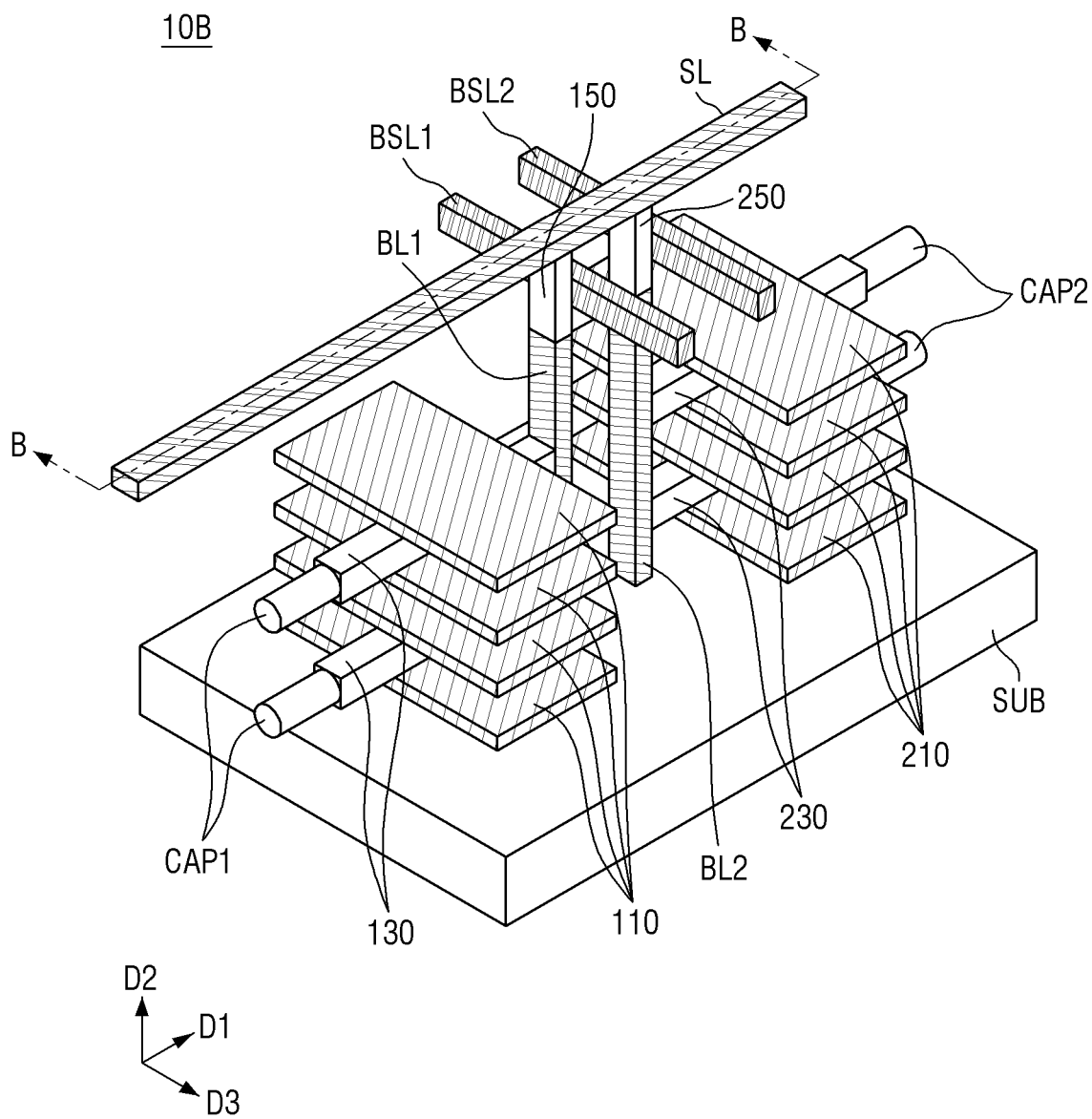
FIGS. 5 and 6 are views for describing a semiconductor memory device according to some example embodiments.
Figure 6:
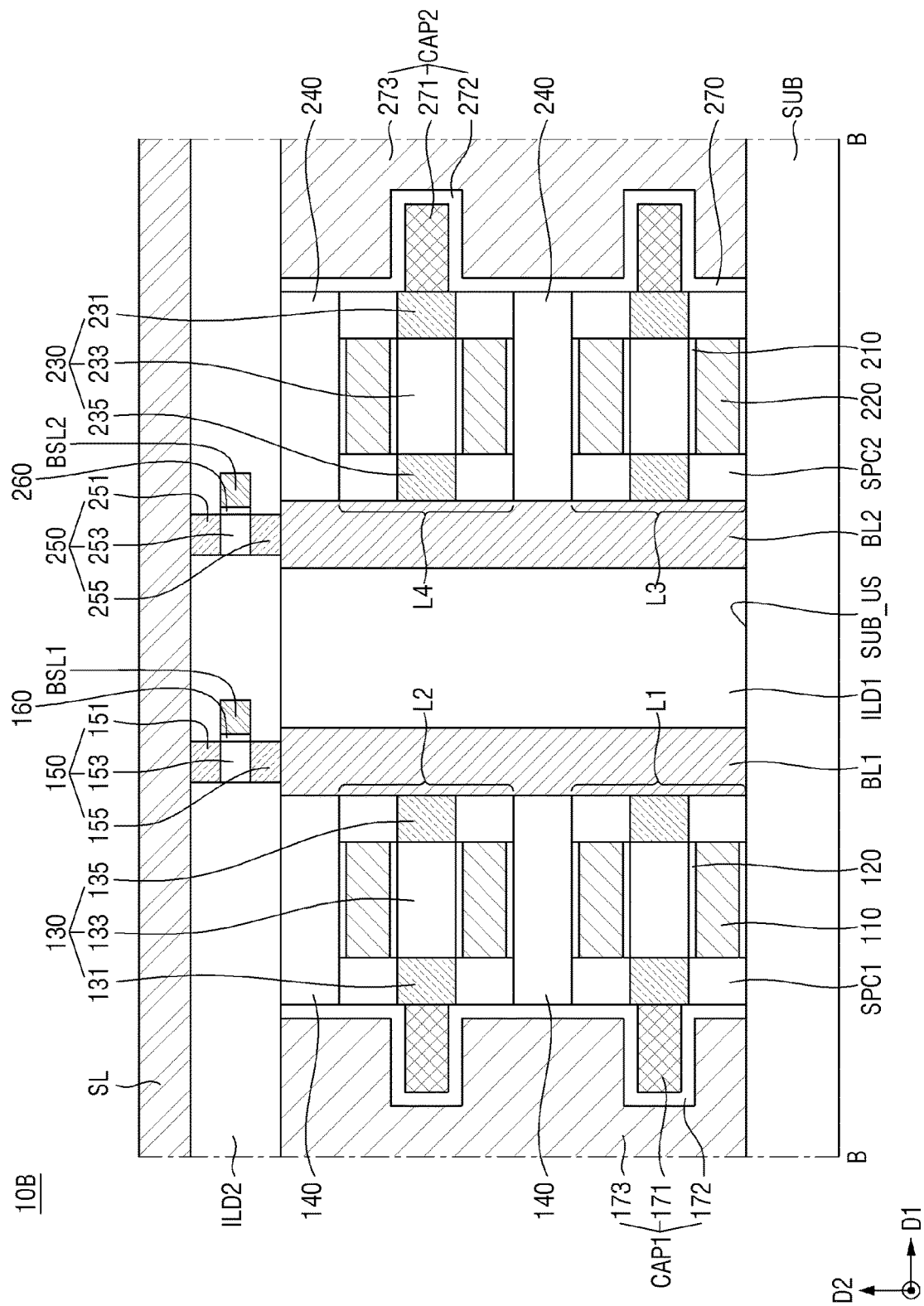

FIGS. 5 and 6 are views for describing a semiconductor memory device according to some other example embodiments. For reference, FIG. 6 may be a cross-sectional view taken along line B-B of FIG. 5.

Referring to FIGS. 5 and 6, in a semiconductor memory device 10B according to some example embodiments, the first bit line selection line BSL1 may not surround the first selection semiconductor pattern 150. The first bit line selection line BSL1 may be disposed on one side of the first selection semiconductor pattern 150. The first bit line selection line BSL1 is not disposed on the other side of the first selection semiconductor pattern 150.

The second bit line selection line BSL2 may not surround the second selection semiconductor pattern 250. The second bit line selection line BSL2 may be disposed on one side of the second selection semiconductor pattern 250. The second bit line selection line BSL2 is not disposed on the other side of the second selection semiconductor pattern 250.

The first selection gate insulating film 160 may be interposed between the first selection channel pattern 153 and the first bit line selection line BSL1. The first selection gate insulating film 160 may not surround the first selection channel pattern 153.

The second selection gate insulating film 260 may be interposed between the second selection channel pattern 253 and the second bit line selection line BSL2. The second selection gate insulating film 260 may not surround the second selection channel pattern 253.

That is, the selection transistor STR may not have a gate all around (GAA) structure. The selection transistor STR may be, for example, a planar transistor.

It has been illustrated in FIGS. 5 and 6 that the first bit line selection line BSL1 is disposed on the right side of the first selection semiconductor pattern 150 and the second bit line selection line BSL2 is disposed on the right side of the second selection semiconductor pattern 250, but the technical spirit of the present disclosure is not limited thereto. The first bit line selection line BSL1 may be disposed on the right side of the first selection semiconductor pattern 150, and the second bit line selection line BSL2 may be disposed on the left side of the second selection semiconductor pattern 250. In addition, the first bit line selection line BSL1 may be disposed on the left side of the first selection semiconductor pattern 150, and the second bit line selection line BSL2 may be disposed on the right side of the second selection semiconductor pattern 250. In some embodiments, the first bit line selection line BSL1 may be disposed on the left side of the first selection semiconductor pattern 150, and the second bit line selection line BSL2 may be disposed on the left side of the second selection semiconductor pattern 250.

Figure 7:
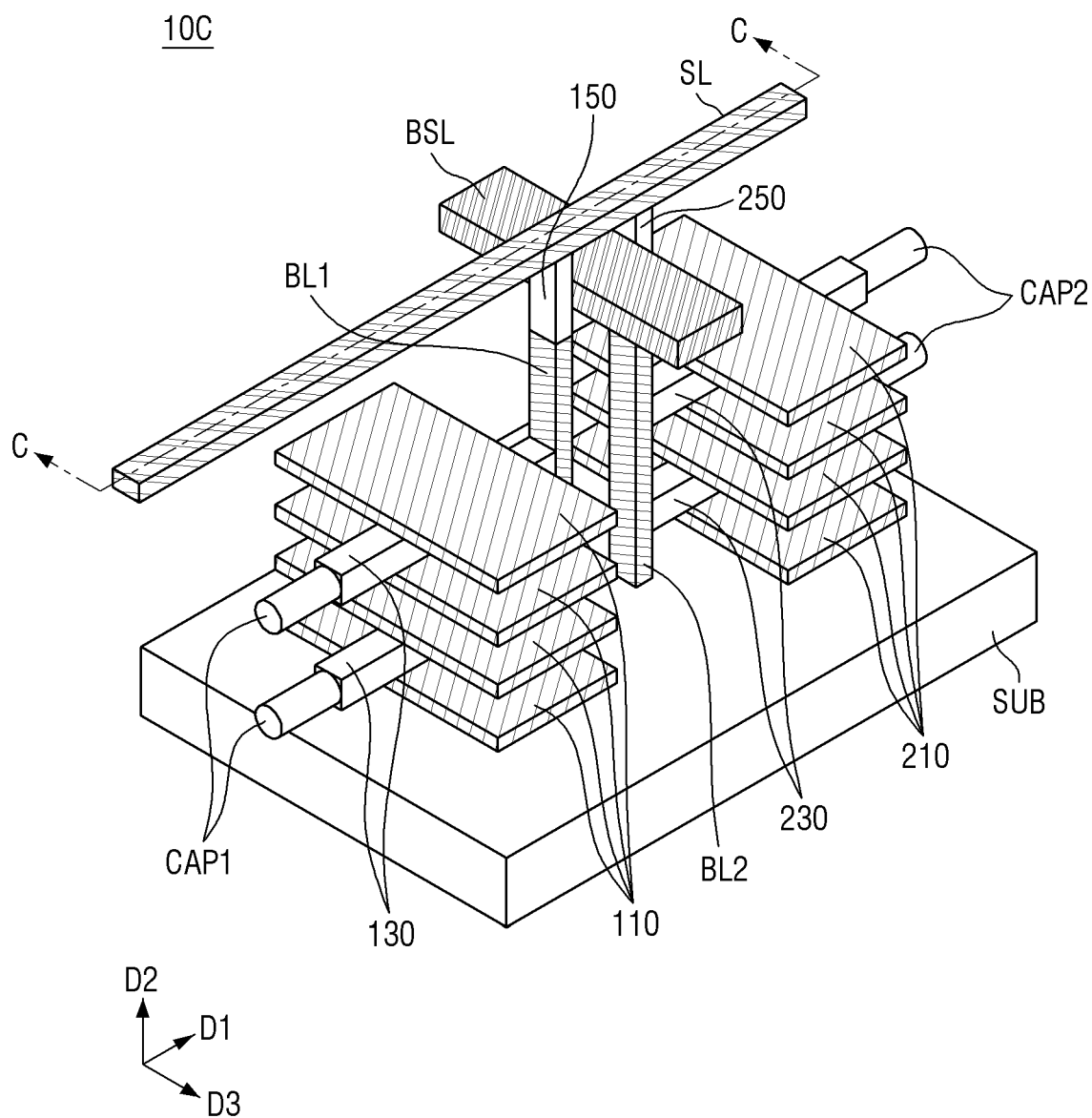
FIGS. 7 and 8 are views for describing a semiconductor memory device according to some example embodiments.
Figure 8:
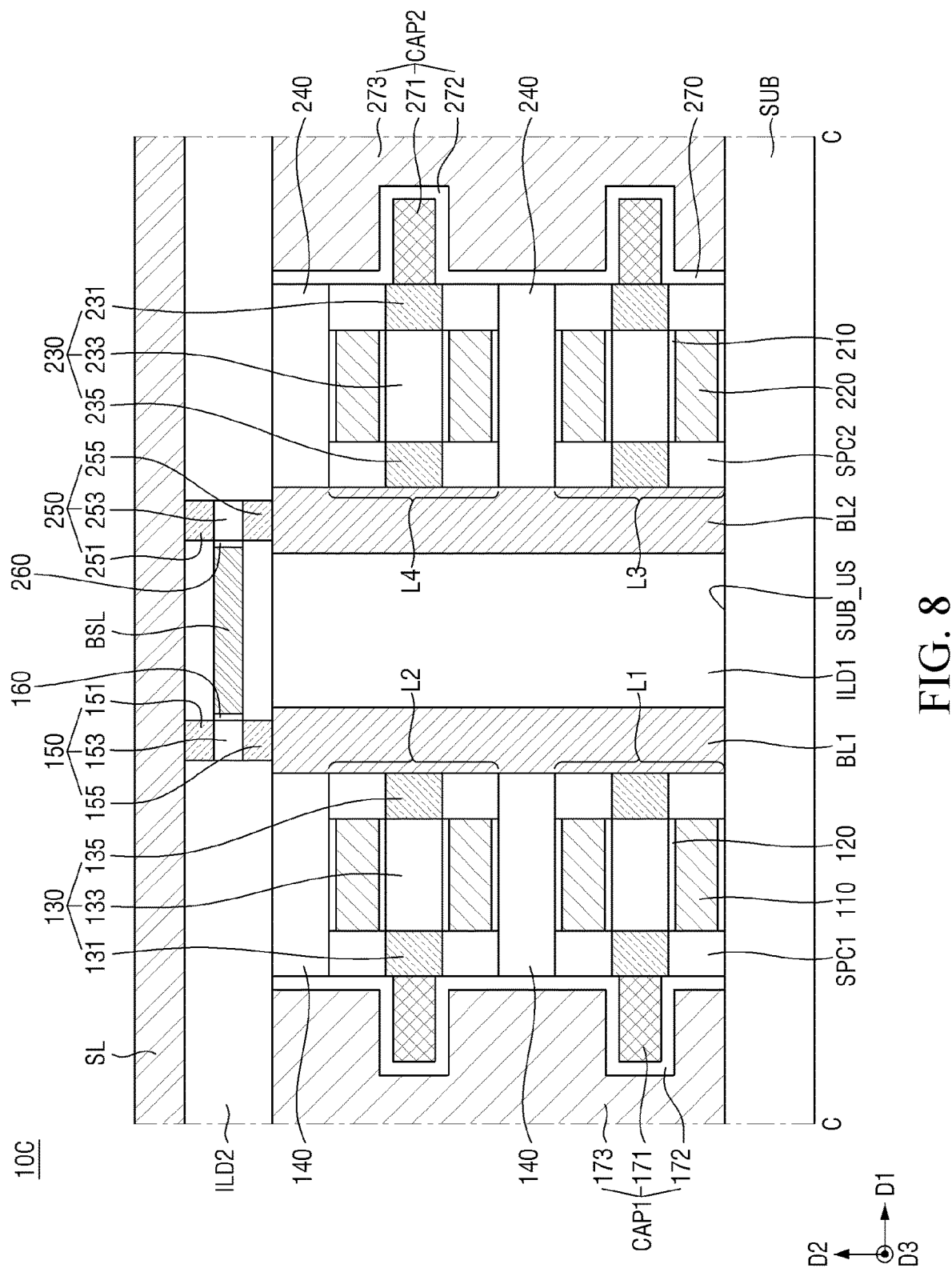

FIGS. 7 and 8 are views for describing a semiconductor memory device according to some other example embodiments. For reference, FIG. 8 may be a cross-sectional view taken along line C-C of FIG. 7.

Referring to FIGS. 7 and 8, in a semiconductor memory device 10C according to some other example embodiments, one bit line selection line BSL may be connected to both the first selection semiconductor pattern 150 and the second selection semiconductor pattern 250. That is, two selection transistors STR may share one bit line selection line BSL with each other.

Specifically, the bit line selection line BSL may be interposed between the first selection semiconductor pattern 150 and the second selection semiconductor pattern 250. One side of the bit line selection line BSL may be connected to the first selection semiconductor pattern 150, and the other side of the bit line selection line BSL may be connected to the second selection semiconductor pattern 250.

The first selection gate insulating film 160 may be interposed between the first selection semiconductor pattern 150 and the bit line selection line BSL. The second selection gate insulating film 260 may be interposed between the second selection semiconductor pattern 250 and the bit line selection line BSL. The first selection gate insulating film 160 does not surround a circumference of the first selection channel pattern 153 in plan view. The second selection gate insulating film 260 does not surround a circumference of the second selection channel pattern 253 in plan view. That is, the selection transistor STR may not have a gate all around (GAA) structure. The selection transistor STR may be, for example, a planar transistor.

Figure 9:
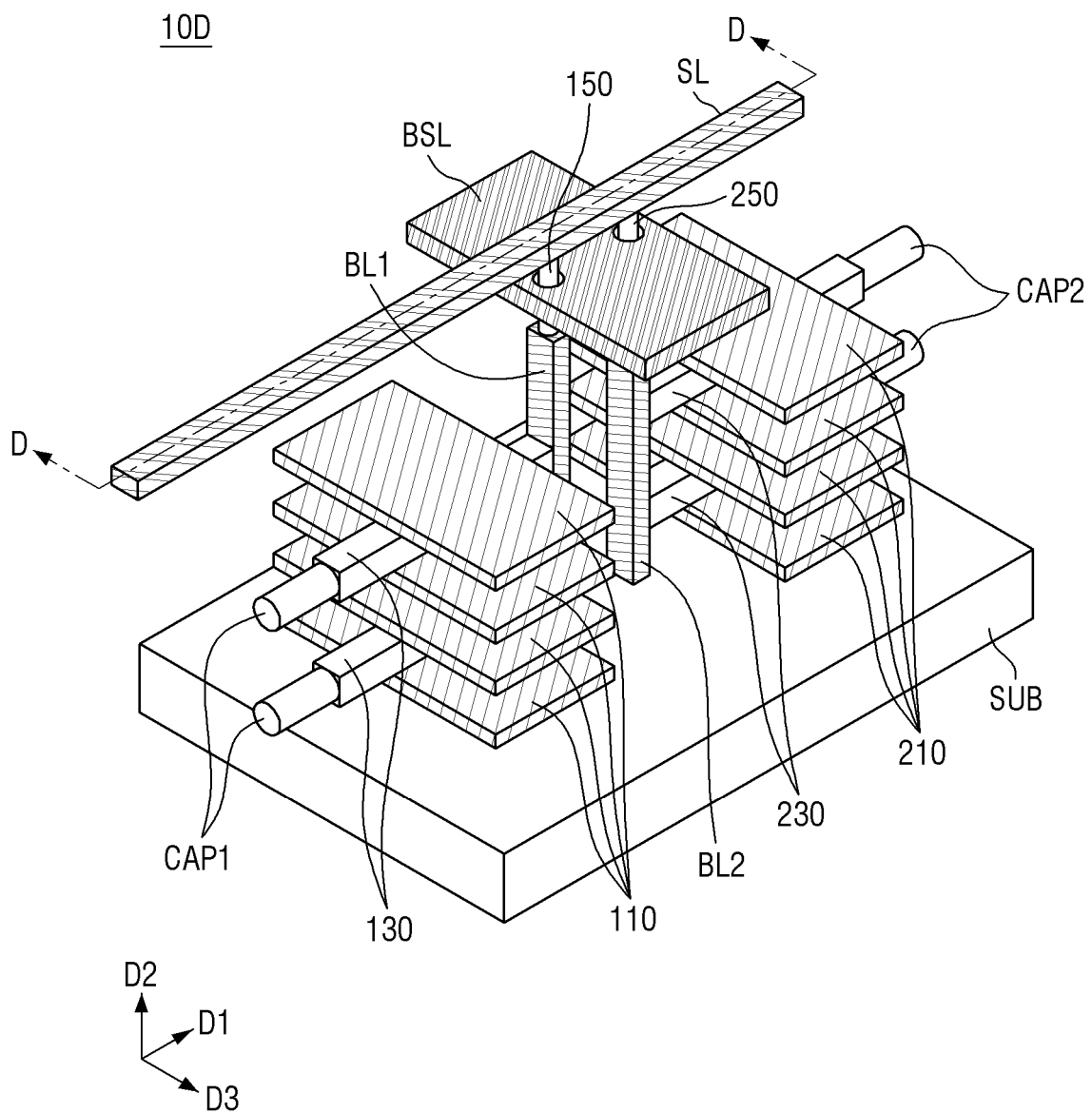
FIGS. 9 and 10 are views for describing a semiconductor memory device according to some example embodiments.
Figure 10:
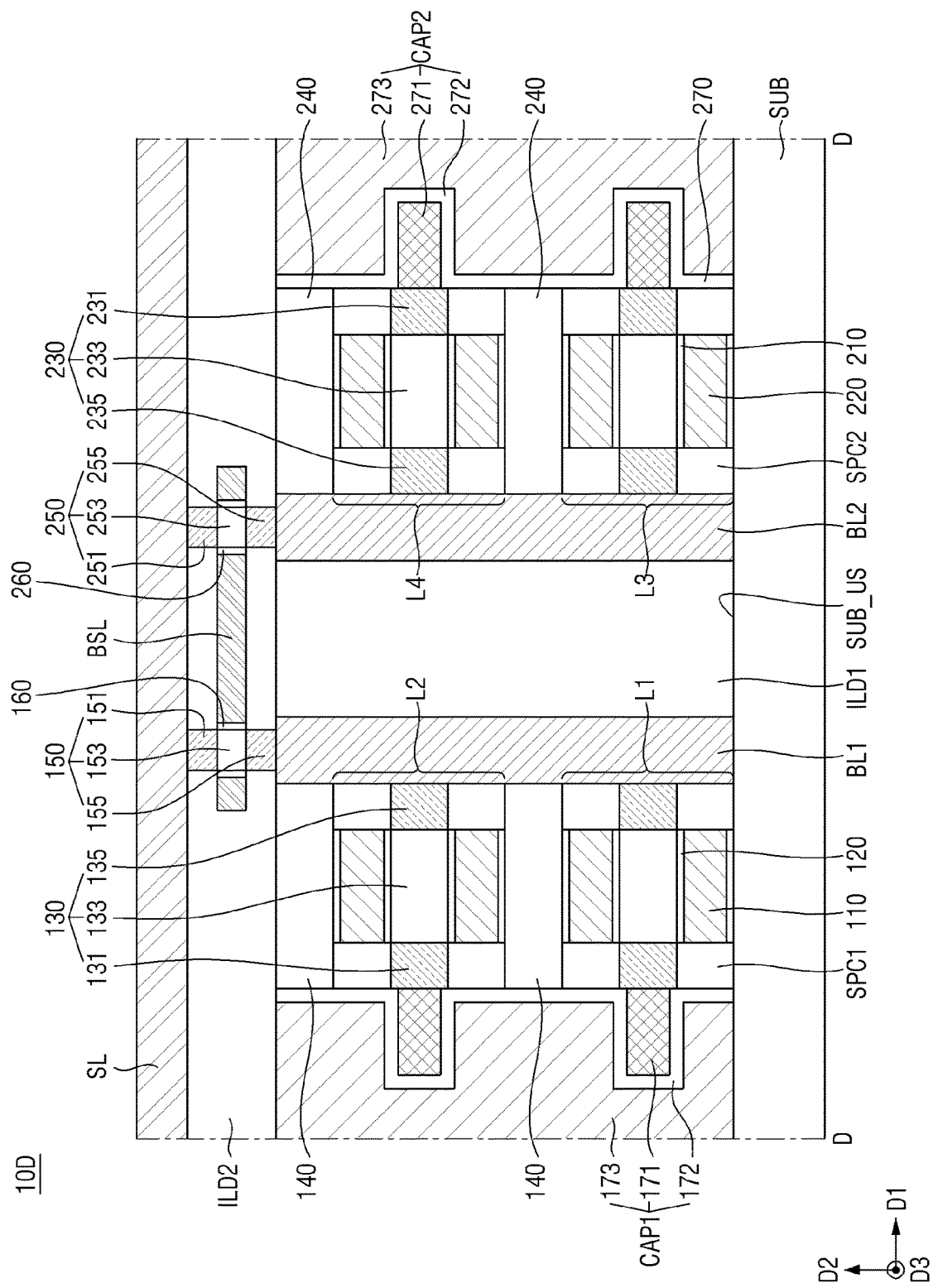

FIGS. 9 and 10 are views for describing a semiconductor memory device according to some example embodiments. For reference, FIG. 10 may be a cross-sectional view taken along line D-D of FIG. 9.

Referring to FIGS. 9 and 10, in a semiconductor memory device 10D according to some example embodiments, one bit line selection line BSL may be connected to both the first selection semiconductor pattern 150 and the second selection semiconductor pattern 250. That is, two selection transistors STR may share one bit line selection line BSL with each other.

In this case, the bit line selection line BSL may surround a portion of the first selection semiconductor pattern 150. The bit line selection line BSL may surround a portion of the second selection semiconductor pattern 250.

Specifically, the bit line selection line BSL may surround the first selection channel pattern 153 in plan view. The bit line selection line BSL may surround the second selection channel pattern 253 in plan view. That is, the selection transistor STR may have a gate all around (GAA) structure.

The first selection gate insulating film 160 is interposed between the bit line selection line BSL and the first selection channel pattern 153. The first selection gate insulating film 160 may surround an outer peripheral surface of the first selection channel pattern 153. The second selection gate insulating film 260 is interposed between the bit line selection line BSL and the second selection channel pattern 253.

The second selection gate insulating film 260 may surround an outer peripheral surface of the second selection channel pattern 253.

Figure 11:
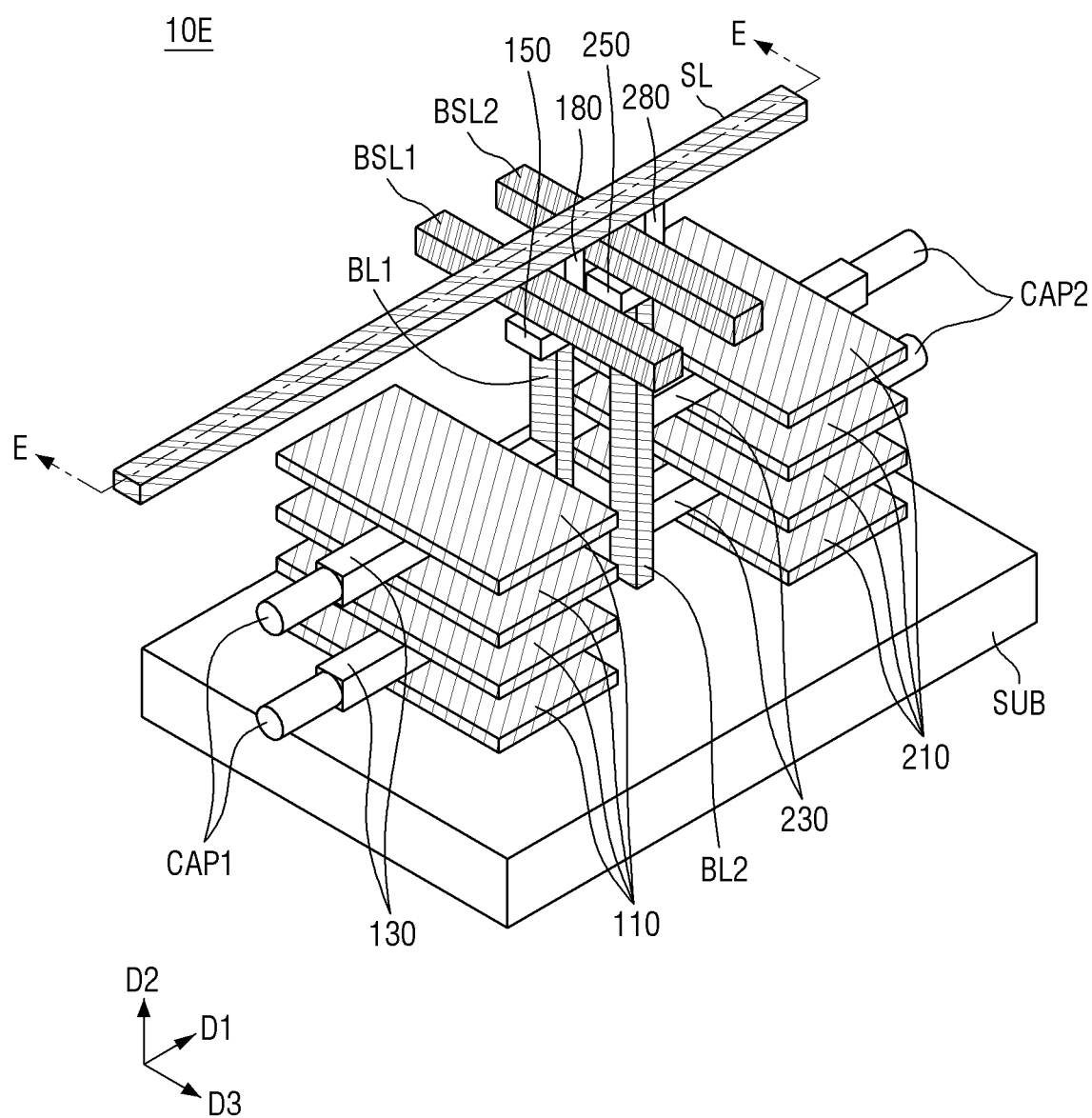
FIGS. 11 and 12 are views for describing a semiconductor memory device according to some example embodiments.
Figure 12:
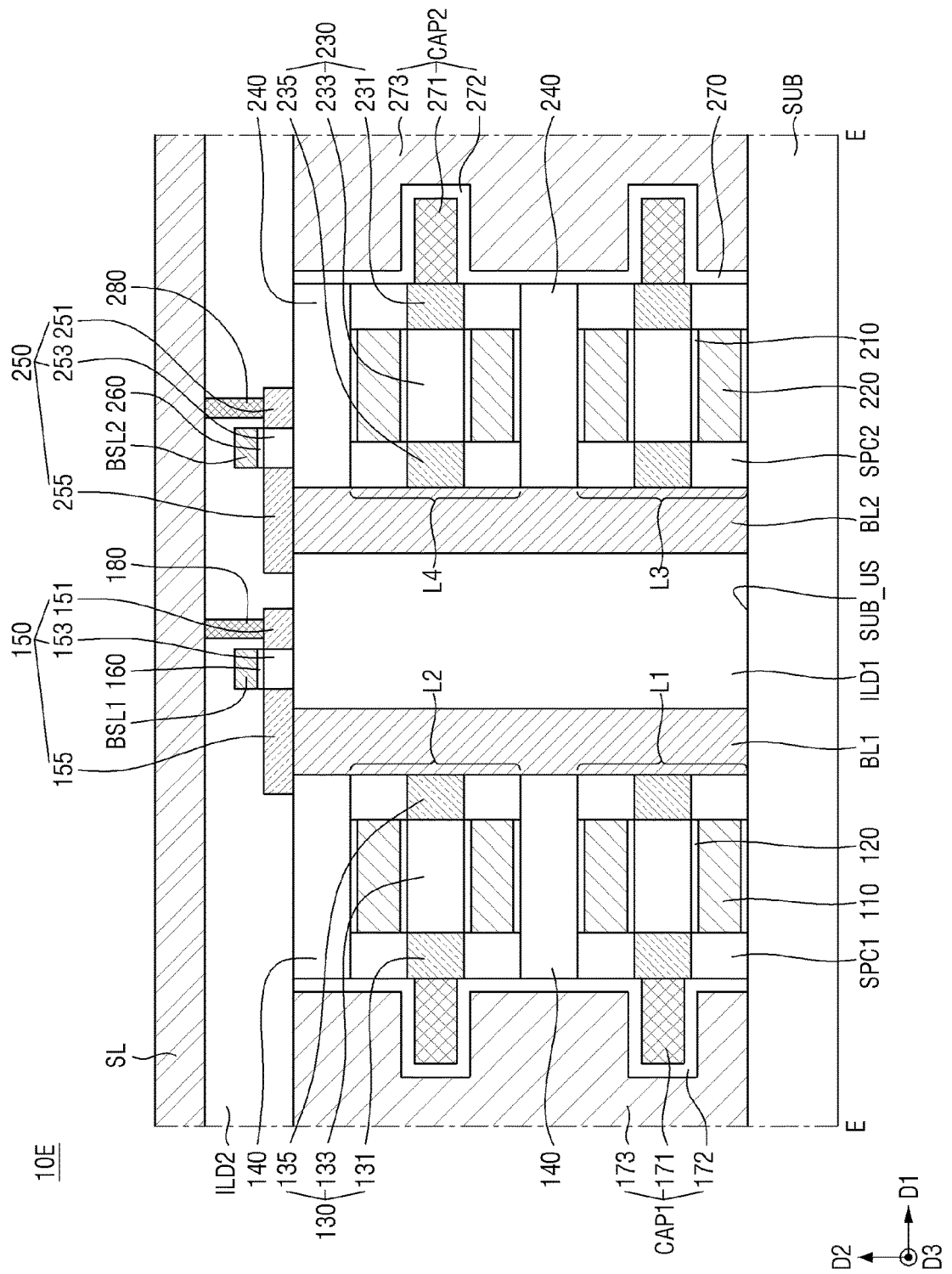

FIGS. 11 and 12 are views for describing a semiconductor memory device according to some example embodiments. For reference, FIG. 12 may be a cross-sectional view taken along line E-E of FIG. 11.

Referring to FIGS. 11 and 12, in a semiconductor memory device 10E according to some example embodiments, the first selection semiconductor pattern 150 may be in contact with the first bit line BL1, but may not be in contact with the bit line strapping line SL. The second selection semiconductor pattern 250 may be in contact with the second bit line BL2, but may not be in contact with the bit line strapping line SL.

Specifically, the first selection semiconductor pattern 150 may extend along an upper surface of the first interlayer insulating film ILD1 and an upper surface of the first bit line BL1. At least a portion of the first selection semiconductor pattern 150 may extend along an upper surface of the first mold insulating layer 140.

The second selection source/drain pattern 155 of the first selection semiconductor pattern 150 may be disposed on the first bit line BL1. The second selection source/drain pattern 155 of the first selection semiconductor pattern 150 may be in contact with the first bit line BL1. The second selection source/drain pattern 155 of the first selection semiconductor pattern 150 may be connected to the first bit line BL1.

The first selection channel pattern 153 may overlap the first bit line selection line BSL1 in the second direction D2. The first selection gate insulating film 160 may be disposed between the first selection channel pattern 153 and the first bit line selection line BSL1.

The first selection source/drain pattern 151 of the first selection semiconductor pattern 150 is not disposed on the first bit line BL1. The first selection source/drain pattern 151 of the first selection semiconductor pattern 150 is not in contact with the first bit line BL1. The first selection source/drain pattern 151 of the first selection semiconductor pattern 150 may be disposed on one side of the first selection channel pattern 153. The first selection source/drain pattern 151 of the first selection semiconductor pattern 150 may be electrically connected to the bit line strapping line SL. However, the first selection source/drain pattern 151 is not in contact with the bit line strapping line SL.

The semiconductor memory device 10E according to some example embodiments may further include a first via contact 180.

The first via contact 180 may be disposed between the first selection source/drain pattern 151 and the bit line strapping line SL. The first selection source/drain pattern 151 and the bit line strapping line SL may be electrically connected to each other through the first via contact 180.

The second selection semiconductor pattern 250 may extend along the upper surface of the first interlayer insulating film ILD1 and an upper surface of the second bit line BL2. At least a portion of the second selection semiconductor pattern 250 may extend along an upper surface of the second mold insulating layer 240.

The fourth selection source/drain pattern 255 of the second selection semiconductor pattern 250 may be disposed on the second bit line BL2. The fourth selection source/drain pattern 255 of the second selection semiconductor pattern 250 may be in contact with the second bit line BL2. The fourth selection source/drain pattern 255 of the second selection semiconductor pattern 250 may be connected to the second bit line BL2.

The second selection channel pattern 253 of the second selection semiconductor pattern 250 may overlap the second bit line selection line BSL2 in the second direction D2. The second selection gate insulating film 260 may be disposed between the second selection channel pattern 253 and the second bit line selection line BSL2.

The third selection source/drain pattern 251 of the second selection semiconductor pattern 250 is not disposed on the second bit line BL2. The third selection source/drain pattern 251 of the second selection semiconductor pattern 250 is not in contact with the second bit line BL2. The third selection source/drain pattern 251 of the second selection semiconductor pattern 250 may be disposed on one side of the second selection channel pattern 253. The third selection source/drain pattern 251 of the second selection semiconductor pattern 250 may be electrically connected to the bit line strapping line SL. However, the third selection source/drain pattern 251 is not in contact with the bit line strapping line SL.

The semiconductor memory device 10E according to some example embodiments may further include a second via contact 280.

The second via contact 280 may be disposed between the third selection source/drain pattern 251 and the bit line strapping line SL. The third selection source/drain pattern 251 and the bit line strapping line SL may be electrically connected to each other through the second via contact 280.

Each of the first via contact 180 and the second via contact 280 may include a conductive material. For example, each of the first via contact 180 and the second via contact 280 may be formed of copper (Cu), aluminum (Al), and/or tungsten (W). However, the technical spirit of the present disclosure is not limited thereto.

Figure 13:
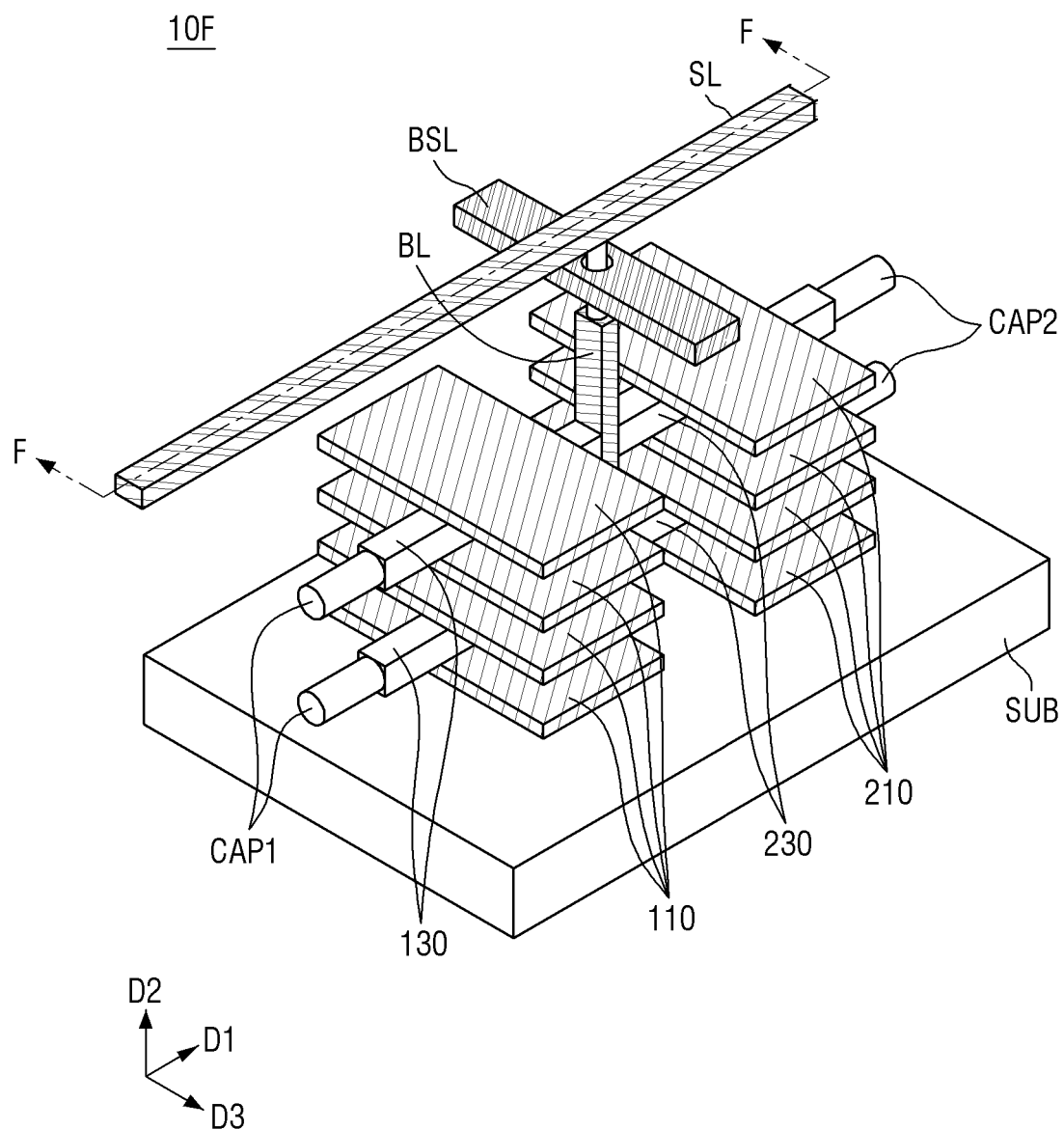
FIGS. 13 and 14 are views for describing a semiconductor memory device according to some example embodiments.
Figure 14:
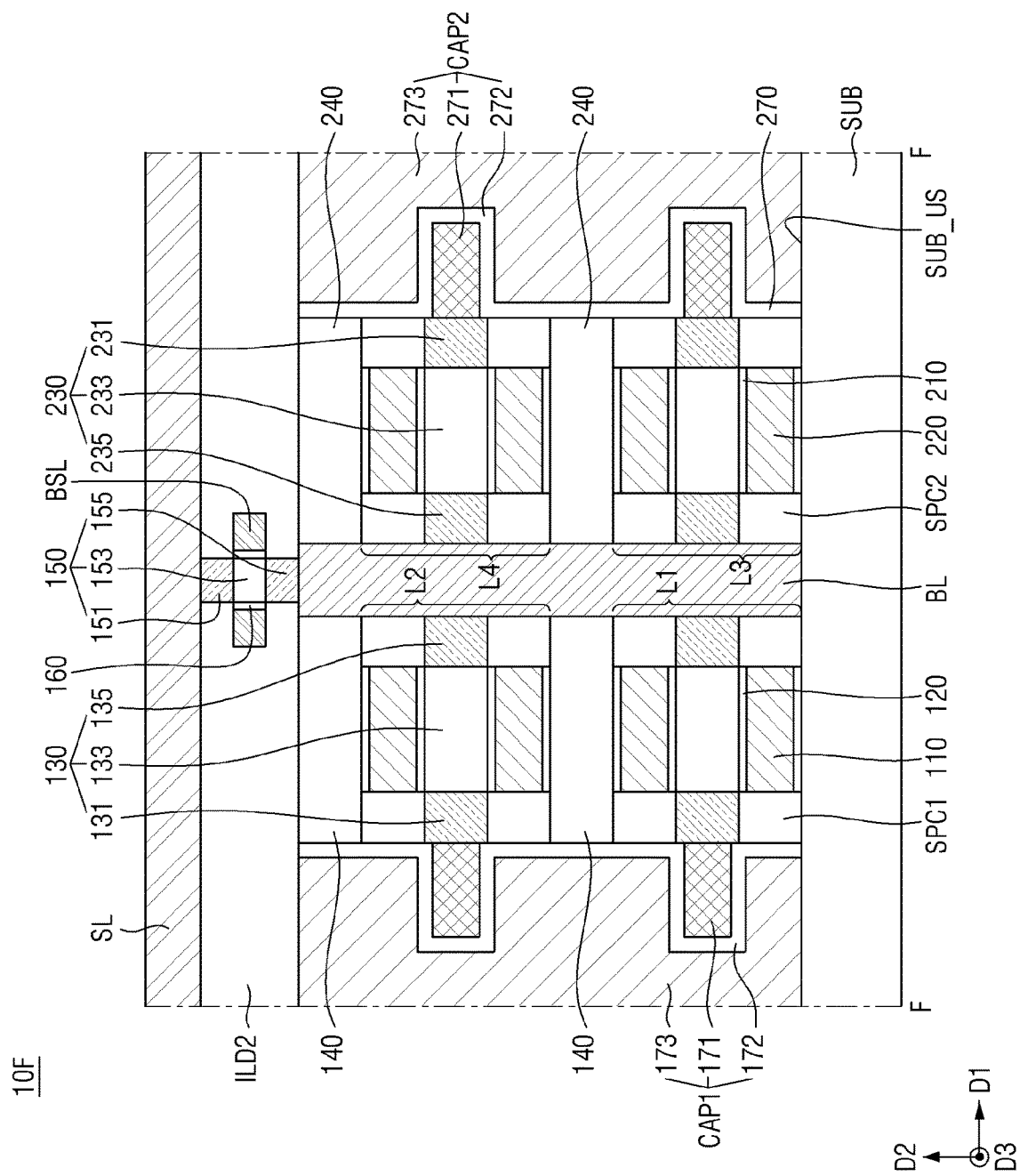

FIGS. 13 and 14 are views for describing a semiconductor memory device according to some example embodiments. For reference, FIG. 14 may be a cross-sectional view taken along line F-F of FIG. 13.

Referring to FIGS. 13 and 14, in a semiconductor memory device 10F according to some example embodiments, the cell transistors CTR may share one bit line BL with each other. For example, the first cell semiconductor pattern 130 may be connected to one side of the bit line BL, and the second cell semiconductor pattern 230 may be connected to the other side of the bit line BL.

Specifically, the bit line BL may extend in the second direction D2. A stacked structure including the first layer L1 and the second layer L2 may be disposed on one side of the bit line BL extending in the second direction D2. A stacked structure including the third layer L3 and the fourth layer L4 may be disposed on the other side of the bit line BL extending in the second direction D2. The first interlayer insulating film ILD1 may not be disposed between the first and second layers L1 and L2 and the third and fourth layers L3 and L4.

In addition, the second cell source/drain pattern 135 of the first cell semiconductor pattern 130 may be in contact with the bit line BL. The fourth cell source/drain pattern 235 of the second cell semiconductor pattern 230 may be in contact with the bit line BL.

In addition, one side of the bit line BL may be in contact with the first spacer pattern SPC1, and the other side of the bit line BL may be in contact with the second spacer pattern SPC2. One side of the bit line BL may be in contact with the first mold insulating layer 140, and the other side of the bit line BL may be in contact with the second mold insulating layer 240.

Figure 15:
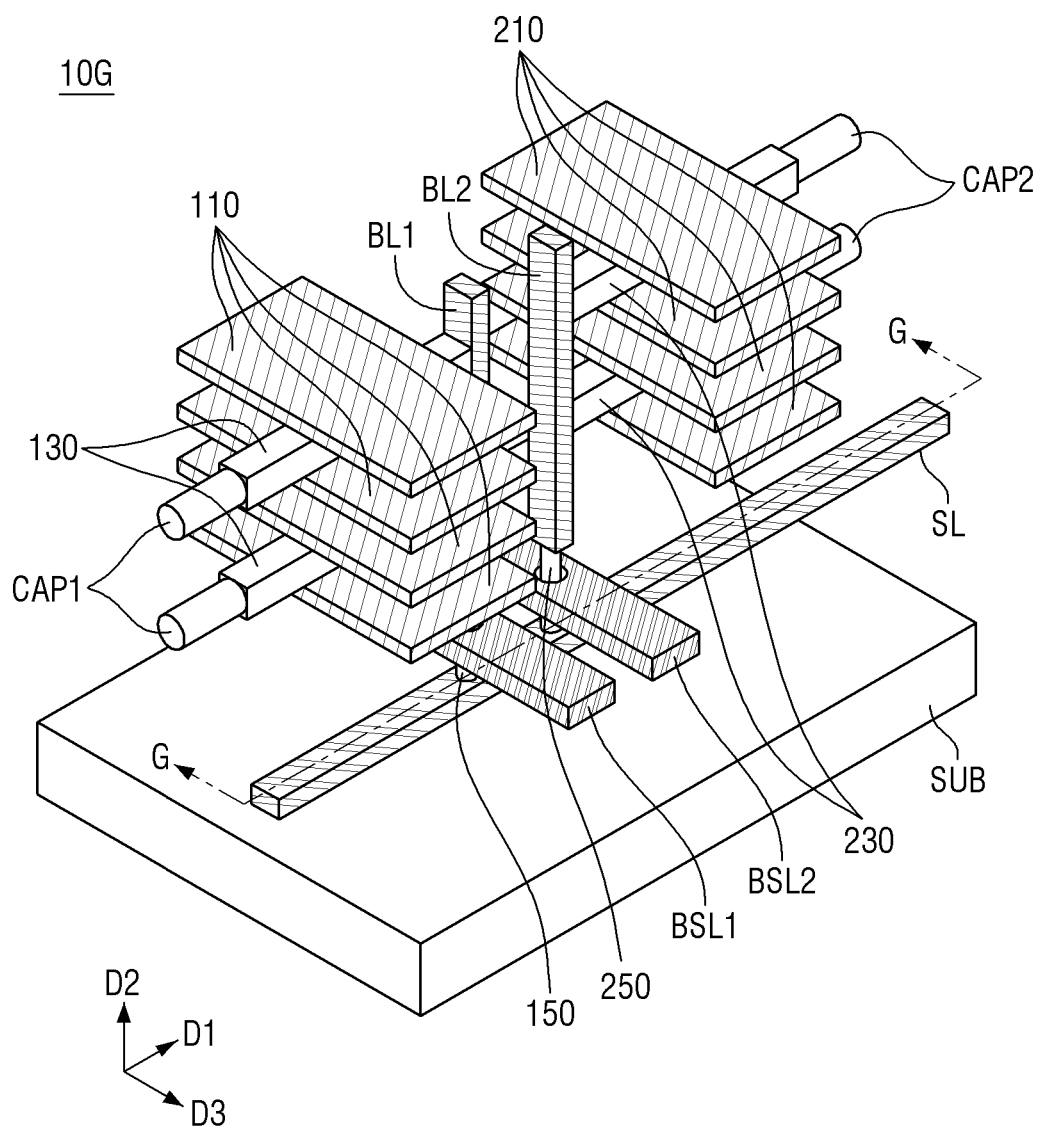
FIGS. 15 and 16 are views for describing a semiconductor memory device according to some example embodiments.
Figure 16:
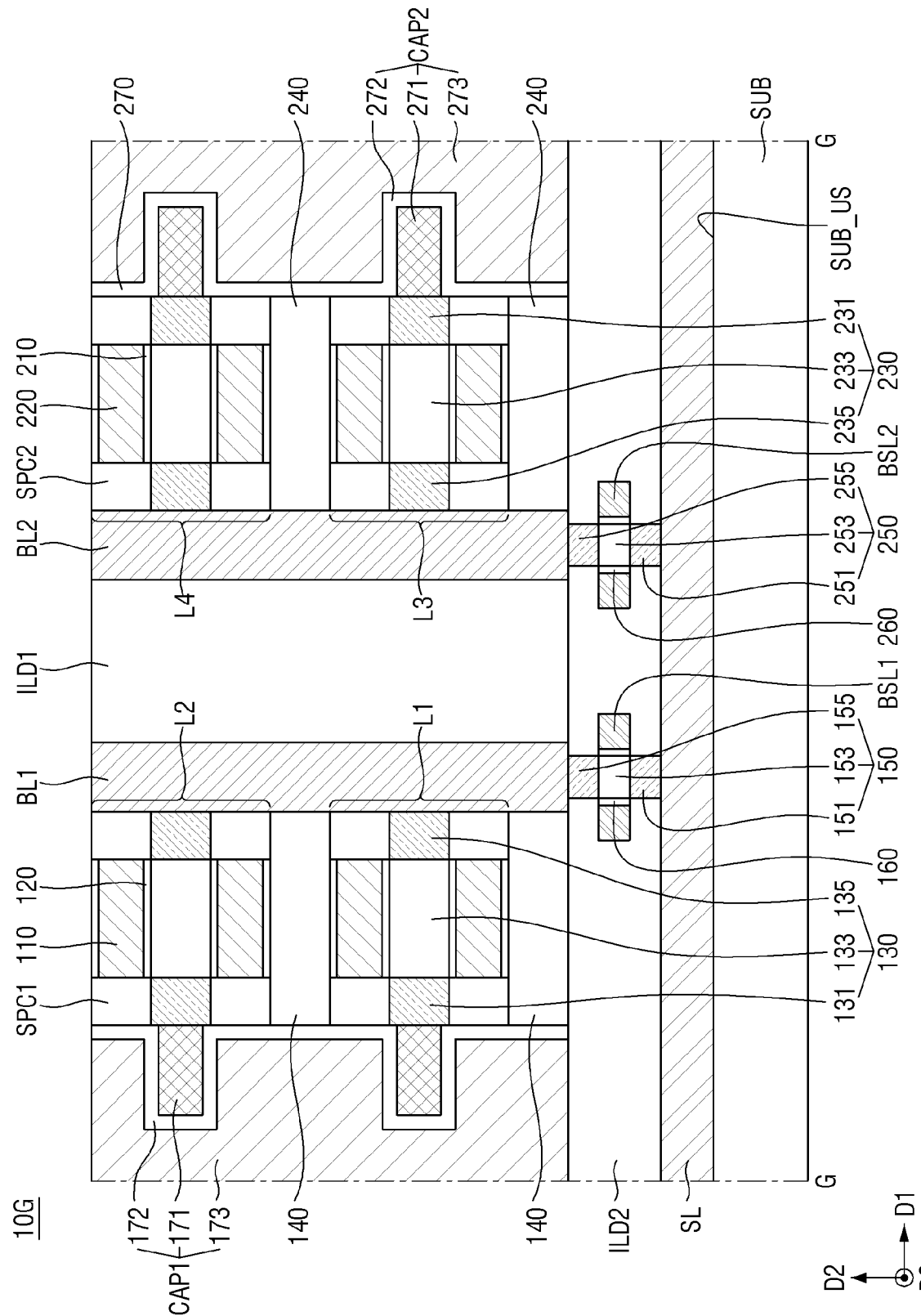

FIGS. 15 and 16 are views for describing a semiconductor memory device according to some example embodiments. For reference, FIG. 16 may be a cross-sectional view taken along line G-G of FIG. 15.

Referring to FIGS. 15 and 16, in a semiconductor memory device 10G according to some example embodiments, the first and second bit line selection lines BSL1 and BSL2 and the bit line strapping line SL may be disposed below the first and second bit lines BL1 and BL2.

The bit line strapping line SL may be disposed between the first and second bit lines BL1 and BL2 and the substrate SUB. The first bit line selection line BSL1 is disposed between the substrate SUB and the first bit line BL1. The second bit line selection line BSL2 is disposed between the substrate SUB and the second bit line BL2.

It has been illustrated in FIGS. 15 and 16 that the first bit line selection line BSL1 surrounds a portion of the first selection semiconductor pattern 150 and the second bit line selection line BSL2 surrounds a portion of the second selection semiconductor pattern 250 in plan view, but the technical spirit of the present disclosure is not limited thereto.

Figure 17:
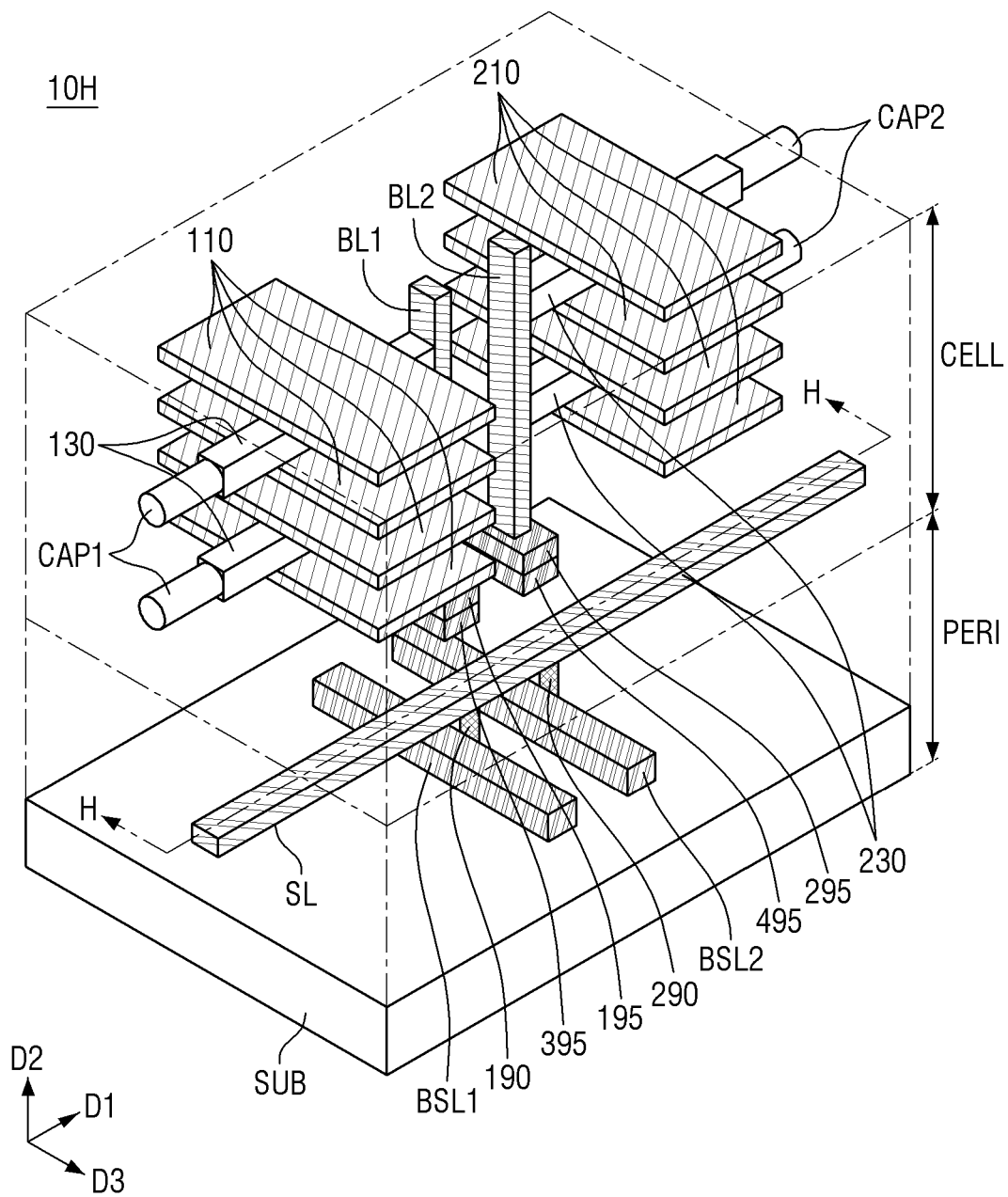
FIGS. 17 and 18 are views for describing a semiconductor memory device according to some example embodiments.
Figure 18:
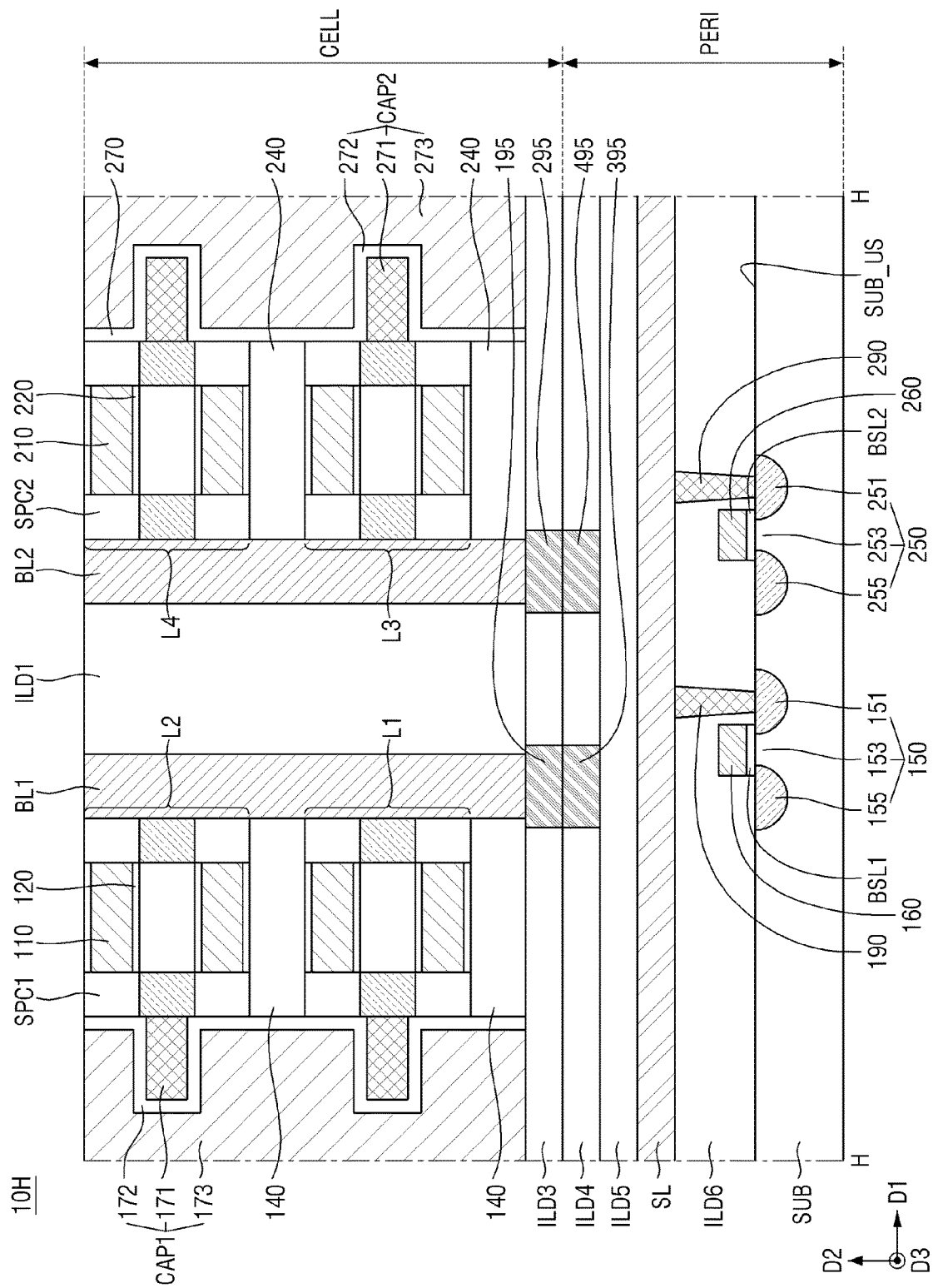

FIGS. 17 and 18 are views for describing a semiconductor memory device according to some example embodiments. For reference, FIG. 18 may be a cross-sectional view taken along line H-H of FIG. 17.

Referring to FIGS. 17 and 18, a semiconductor memory device 10H according to some example embodiments may include a cell structure CELL and a peripheral circuit structure PERI. The cell structure CELL may be disposed on the peripheral circuit structure PERI. The semiconductor memory device 10H according to some example embodiments may have a cell-on-periphery structure.

The peripheral circuit structure PERI may include a substrate SUB, a fourth interlayer insulating film ILD4, a fifth interlayer insulating film ILD5, a sixth interlayer insulating film ILD6, a third bonding metal 395, a fourth bonding metal 495, a bit line strapping line SL, first and second bit line selection lines BSL1 and BSL2, a first contact 190, and a second contact 290.

A first selection semiconductor pattern 150 and a second selection semiconductor pattern 250 may be formed in the substrate SUB.

The first selection semiconductor pattern 150 may include a first selection source/drain pattern 151, a first selection channel pattern 153, and a second selection source/drain pattern 155. The first selection source/drain pattern 151 and the second selection source/drain pattern 155 may be formed by implanting impurities into the substrate SUB. Each of the first selection source/drain pattern 151 and the second selection source/drain pattern 155 may have n-type or p-type conductivity. The first selection channel pattern 153 may be used as a channel of the selection transistor STR.

The second selection semiconductor pattern 250 may include a third selection source/drain pattern 251, a second selection channel pattern 253, and a fourth selection source/drain pattern 255. The third selection source/drain pattern 251 and the fourth selection source/drain pattern 255 may be formed by implanting impurities into the substrate SUB. Each of the third selection source/drain pattern 251 and the fourth selection source/drain pattern 255 may have n-type or p-type conductivity. The second selection channel pattern 253 may be used as a channel of the selection transistor STR.

The first selection source/drain pattern 151 may be connected to the bit line strapping line SL. For example, the first selection source/drain pattern 151 may be electrically connected to the bit line strapping line SL through the first contact 190 on the first selection source/drain pattern 151. Although not illustrated, the second selection source/drain pattern 155 may be connected to a first bit line BL1. For example, the peripheral circuit structure PERI may include a contact connected to the third bonding metal 395. The contact may be formed in the fifth interlayer insulating film ILD5 and the sixth interlayer insulating film ILD6. The second selection source/drain pattern 155 and the first bit line BL1 may be electrically connected to each other using the contact.

The third selection source/drain pattern 251 may be connected to the bit line strapping line SL. For example, the third selection source/drain pattern 251 may be electrically connected to the bit line strapping line SL through the second contact 290 on the third selection source/drain pattern 251. Although not illustrated, the fourth selection source/drain pattern 255 may be connected to a second bit line BL2. For example, the peripheral circuit structure PERI may include a contact connected to the fourth bonding metal 495. The contact may be formed in the fifth interlayer insulating film ILD5 and the sixth interlayer insulating film ILD6. The fourth selection source/drain pattern 255 and the second bit line BL2 may be electrically connected to each other using the contact.

In example embodiments, each of the first contact 190 and the second contact 290 may include a conductive material. For example, each of the first contact 190 and the second contact 290 may be formed of copper (Cu), aluminum (Al), and/or tungsten (W). However, the technical spirit of the present disclosure is not limited thereto.

The sixth interlayer insulating film ILD6 may cover or overlap the first and second bit line selection lines BSL1 and BSL2. In addition, the sixth interlayer insulating film ILD6 may surround the first contact 190 and the second contact 290 in plan view. The sixth interlayer insulating film ILD6 may include an insulating material. The sixth interlayer insulating film ILD6 may be formed of the same material as the first interlayer insulating film ILD1.

The fifth interlayer insulating film ILD5 may be disposed on the bit line strapping line SL. The fourth interlayer insulating film ILD4 may be disposed on the fifth interlayer insulating film ILD5. Each of the fifth interlayer insulating film ILD5 and the fourth interlayer insulating film ILD4 may include an insulating material. Each of the fifth interlayer insulating film ILD5 and the fourth interlayer insulating film ILD4 may be formed of the same material as the first interlayer insulating film ILD1.

The third bonding metal 395 and the fourth bonding metal 495 are disposed in the fourth interlayer insulating film ILD4. An upper surface of the third bonding metal 395 may be an upper surface of the peripheral circuit structure PERI. Similarly, an upper surface of the fourth bonding metal 495 may be an upper surface of the peripheral circuit structure PERI. The third bonding metal 395 and the fourth bonding metal 495 may expose the upper surface of the peripheral circuit structure PERI. Each of the third bonding metal 395 and the fourth bonding metal 495 may be formed of copper (Cu), but is not limited thereto.

The cell structure CELL may include a third interlayer insulating film ILD3, a first interlayer insulating film ILD1, the first and second bit lines BL1 and BL2, first gate electrodes 110, second gate electrodes 210, first cell semiconductor patterns 130, second cell semiconductor patterns 230, a first mold insulating layer 140, a second mold insulating layer 240, a first spacer pattern SPC1, a second spacer pattern SPC2, a first capacitor structure CAP1, and a second capacitor structure CAP2.

The third interlayer insulating film ILD3 may be disposed at the lowermost portion of the cell structure CELL. A lower surface of the third interlayer insulating film ILD3 may be a lower surface of the cell structure CELL. The third interlayer insulating film ILD3 may include an insulating material. The third interlayer insulating film ILD3 may be formed of the same material as the first interlayer insulating film ILD1.

A first bonding metal 195 and a second bonding metal 295 may be disposed in the third interlayer insulating film ILD3. The first bonding metal 195 may be connected to the first bit line BL1. The second bonding metal 295 may be connected to the second bit line BL2. A lower surface of the first bonding metal 195 may be a lower surface of the cell structure CELL. A lower surface of the second bonding metal 295 may be a lower surface of the cell structure CELL. The first bonding metal 195 and the second bonding metal 295 may expose the lower surface of the cell structure CELL. Each of the first bonding metal 195 and the second bonding metal 295 may be formed of copper (Cu), but is not limited thereto.

The semiconductor memory device 10H according to some example embodiments may have a chip to chip (C2C) structure. The C2C structure refers to a structure of manufacturing an upper chip including the cell structure CELL, manufacturing a lower chip including the peripheral circuit structure PERI, and then connecting then the upper chip and the lower chip to each other by a bonding method.

As an example, the bonding method may refer to a method of electrically connecting the first and second bonding metals 195 and 295 formed on the lowermost metal layer of the upper chip and the third and fourth bonding metals 395 and 495 formed on the uppermost metal layer of the lower chip to each other, respectively.

For example, when the first and second bonding metals 195 and 295 and the third and fourth bonding metals 395 and 495 are formed of copper (Cu), the bonding method may be a Cu—Cu bonding method. However, this is only an example, and the first and second bonding metals 195 and 295 and the third and fourth bonding metals 395 and 495 may also be formed of various other metals such as aluminum (Al) or tungsten (W), respectively.

The first bonding metal 195 and the third bonding metal 395 are connected to each other and the second bonding metal 295 and the fourth bonding metal 495 are connected to each other, and accordingly the cell structure CELL and the peripheral circuit structure PERI may be electrically connected to each other. For example, the first bit line BL1, the bit line strapping line SL, and the first bit line selection line BSL1 may be connected to each other through the first bonding metal 195 and the third bonding metal 395. The second bit line BL2, the bit line strapping line SL, and the second bit line selection line BSL2 may be connected to each other through the second bonding metal 295 and the fourth bonding metal 495.

Figure 19:
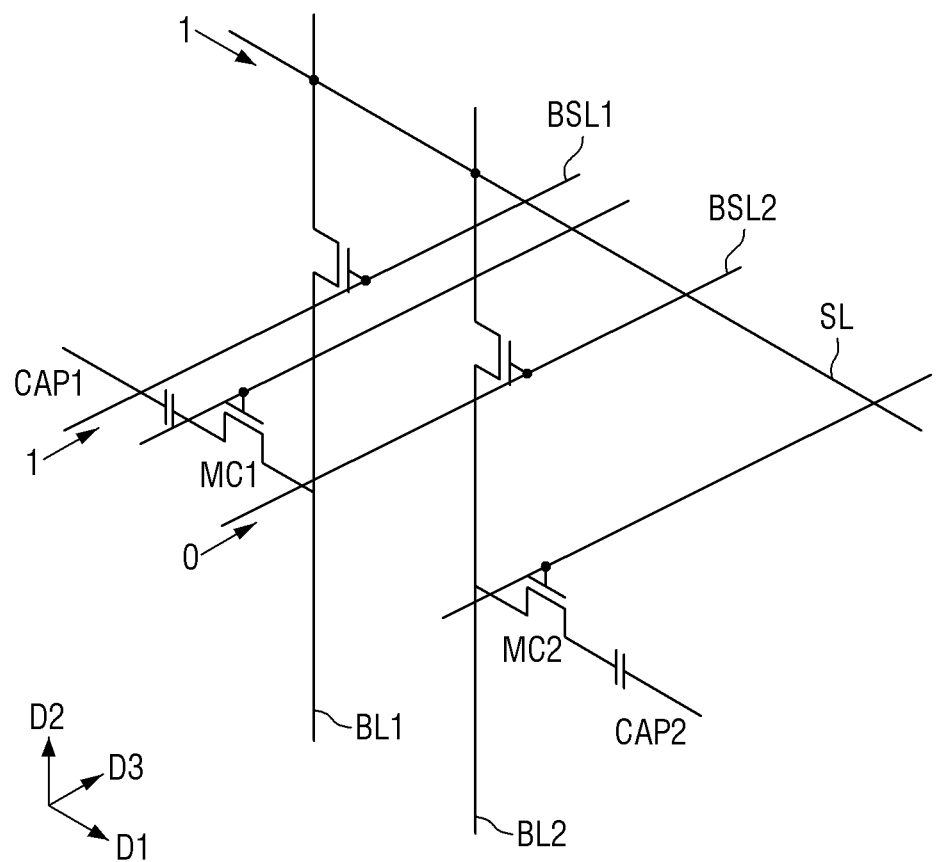
FIG. 19 is a diagram for describing an operating method of a semiconductor memory device according to some example embodiments.

FIG. 19 is a diagram for describing an operating method of a semiconductor memory device according to example embodiments. For convenience of explanation, contents overlapping those described with reference to FIGS. 1 to 18 will be briefly described or a description thereof will be omitted.

Referring to FIG. 19, a semiconductor memory device according to some example embodiments may include a first bit line BL1, a second bit line BL2, a first bit line selection line BSL1, a second bit line selection line BSL2, a bit line strapping line SL, a first memory cell MC1, a second memory cell MC2, a first capacitor structure CAP1, and a second capacitor structure CAP2.

As described above, the bit line strapping line SL is connected to the first and second bit lines BL1 and BL2. The first bit line selection line BSL1 is connected to the bit line strapping line SL and the first bit line BL1. The second bit line selection line BSL2 is connected to the bit line strapping line SL and the second bit line BL2.

In some example embodiments, data may be stored in the first memory cell MC1. The data may be stored in the first memory cell MC1 by applying a voltage to the first bit line BL1. Data may be stored in the second memory cell MC2. The data may be stored in the second memory cell MC2 by applying a voltage to the second bit line BL2.

In some example embodiments, a voltage may be applied to the bit line strapping line SL and the first bit line selection line BSL1 in response to a command to store data in the first memory cell MC1. In this case, a voltage is applied to the second bit line selection line BSL2. Accordingly, a current may flow through the first bit line BL1 and may not flow through the second bit line BL2.

Conversely, a voltage may be applied to the bit line strapping line SL and the second bit line selection line BSL2 in response to a command to store data in the second memory cell MC2. In this case, a voltage is applied to the first bit line selection line BSL1. Accordingly, a current may flow through the second bit line BL2 and may not flow through the first bit line BL1.

As such, when the semiconductor memory device according to some example embodiments is used, a current may selectively flow only through the bit line connected to the memory cell in which the data is to be stored. Accordingly, a total amount of capacitance of the bit lines may decrease. Accordingly, a semiconductor memory device with improved reliability may be provided.

What is claimed is:

1. A semiconductor memory device comprising:
    a substrate;
    a gate electrode on the substrate and extending in a first direction parallel to an upper surface of the substrate;
    a bit line on the substrate and extending in a second direction perpendicular to the upper surface of the substrate;
    a cell semiconductor pattern on a side of the gate electrode and electrically connected to the bit line;
    a capacitor structure including a first electrode electrically connected to the cell semiconductor pattern, a second electrode on the first electrode, and a capacitor dielectric film between the first electrode and the second electrode;
    a bit line strapping line spaced apart from the bit line in the second direction, extending in the first direction, and electrically connected to the bit line;
    a bit line selection line between the bit line and the bit line strapping line and extending in a third direction that intersects the first and second directions; and
    a selection semiconductor pattern between the bit line and the bit line strapping line and electrically connected to the bit line, the bit line strapping line, and the bit line selection line,
    wherein the gate electrode is between the bit line and the capacitor structure, and
    wherein selection semiconductor pattern comprises:
        a first selection source/drain pattern electrically connected to the bit line; and
        a second selection source/drain pattern electrically connected to the bit line strapping line,
    wherein the first and second selection source/drain patterns are spaced apart from the bit line strapping line.

2. The semiconductor memory device of claim 1, wherein the selection semiconductor pattern further comprises:
    a selection channel pattern between the first selection source/drain pattern and the second selection source/drain pattern.

3. The semiconductor memory device of claim 2, wherein at least a portion of the selection channel pattern is in the bit line selection line.

4. The semiconductor memory device of claim 2, wherein the bit line selection line is on a side of the selection channel pattern.

5. The semiconductor memory device of claim 2, further comprising:
    a via contact between the second selection source/drain pattern and the bit line strapping line and electrically connecting the second selection source/drain pattern and the bit line strapping line to each other.

6. The semiconductor memory device of claim 1, wherein the semiconductor memory device is configured to transfer a signal to the bit line when a voltage is applied to the bit line selection line.

7. The semiconductor memory device of claim 1, wherein the selection semiconductor pattern extends in the second direction.

8. The semiconductor memory device of claim 1, wherein the cell semiconductor pattern comprises:
    a first cell source/drain pattern electrically connected to the bit line;
    a second cell source/drain pattern electrically connected to the capacitor structure; and
    a cell channel pattern between the first cell source/drain pattern and the second cell source/drain pattern.

9. The semiconductor memory device of claim 8, further comprising:
    a gate insulating film between the cell channel pattern and the gate electrode.

10. The semiconductor memory device of claim 1, wherein the bit line strapping line is between the substrate and the bit line.

11. A semiconductor memory device comprising:
    a substrate;
    a first memory cell on the substrate, wherein the first memory cell is configured to store first data;
    a first gate electrode that is electrically connected to the first memory cell and extends in a first direction parallel to an upper surface of the substrate;
    a first bit line extending in a second direction perpendicular to the upper surface of the substrate;
    a first capacitor structure extending in the first direction;
    a second memory cell on the substrate, wherein the second memory cell is configured to store second data;
    a second gate electrode that is electrically connected to the second memory cell and extends in the first direction;
    a second bit line extending in the second direction;
    a second capacitor structure extending in the first direction;
    a bit line strapping line extending in the first direction and electrically connected to the first and second bit lines;
    a first bit line selection line between the first bit line and the bit line strapping line, extending in a third direction that intersects the first and second directions, overlapping the first bit line in the second direction, and electrically connected to the first bit line; and a second bit line selection line between the second bit line and the bit line strapping line, extending in the third direction, overlapping the second bit line in the second direction, and electrically connected to the second bit line, wherein a voltage is configured to be applied to the bit line strapping line and the first bit line selection line in response to a first command to store the first data in the first memory cell, wherein the first gate electrode is between the first bit line and the first capacitor structure.

12. The semiconductor memory device of claim 11, wherein the semiconductor memory device is configured to apply the voltage to the bit line strapping line and the second bit line selection line in response to a second command to store the second data in the second memory cell.

13. The semiconductor memory device of claim 11, further comprising:
a cell semiconductor pattern on a side of the first gate electrode and electrically connected to the first bit line and the first capacitor structure.

14. The semiconductor memory device of claim 13, wherein the cell semiconductor pattern comprises:
a first cell source/drain pattern electrically connected to the first bit line;
a second cell source/drain pattern electrically connected to the first capacitor structure; and
a cell channel pattern between the first cell source/drain pattern and the second cell source/drain pattern.

15. The semiconductor memory device of claim 13, wherein the first capacitor structure includes a first electrode electrically connected to the cell semiconductor pattern, a second electrode on the first electrode, and a capacitor dielectric film between the first electrode and the second electrode.

16. The semiconductor memory device of claim 11, further comprising:
a selection semiconductor pattern between the first bit line and the bit line strapping line and extending in the second direction.

17. The semiconductor memory device of claim 16, wherein at least a portion of the selection semiconductor pattern is in the first bit line selection line.

18. A semiconductor memory device comprising:
a peripheral circuit structure; and
a cell structure on the peripheral circuit structure,
wherein the peripheral circuit structure comprises:
a substrate;
a bit line selection line on the substrate and extending in a third direction parallel to an upper surface of the substrate; and
a selection semiconductor pattern electrically connected to the bit line selection line,
wherein the cell structure comprises:
a gate electrode extending in a first direction parallel to the upper surface of the substrate;
a bit line extending in a second direction perpendicular to the upper surface of the substrate;
a cell semiconductor pattern on a side of the gate electrode and electrically connected to the bit line; and
a capacitor structure including a first electrode electrically connected to the cell semiconductor pattern, a second electrode on the first electrode, and a capacitor dielectric film between the first electrode and the second electrode,
wherein the semiconductor memory device is configured to transfer a signal to the bit line when a voltage is applied to the bit line selection line.

19. The semiconductor memory device of claim 18, wherein the peripheral circuit structure further comprises:
a bit line strapping line extending in the first direction and electrically connected to both the bit line and the bit line selection line,
wherein the bit line strapping line is electrically connected to the selection semiconductor pattern.

20. The semiconductor memory device of claim 18, wherein the peripheral circuit structure further comprises:
a first bonding metal that exposes an upper surface of the peripheral circuit structure and is electrically connected to the selection semiconductor pattern,
wherein the cell structure further comprises a second bonding metal that exposes a lower surface of the cell structure and is electrically connected to the bit line, and
wherein the first bonding metal and the second bonding metal are in contact with each other.

* * * * *